United States Patent
Roscoe et al.

(10) Patent No.: US 11,032,256 B2
(45) Date of Patent: Jun. 8, 2021

(54) SECURE DATA EXCHANGE

(71) Applicant: Oxford University Innovation Limited, Oxfordshire (GB)

(72) Inventors: Andrew William Roscoe, Oxford (GB); Peter Yvain Anthony Ryan, Luxembourg (LU)

(73) Assignee: Oxford University Innovation Limited, Oxfordshire (GB)

( * ) Notice: Subject to any disclaimer, the term of this patent is extended or adjusted under 35 U.S.C. 154(b) by 46 days.

(21) Appl. No.: 16/493,276

(22) PCT Filed: Mar. 16, 2018

(86) PCT No.: PCT/GB2018/050698
§ 371 (c)(1),
(2) Date: Sep. 11, 2019

(87) PCT Pub. No.: WO2018/167517
PCT Pub. Date: Sep. 20, 2018

(65) Prior Publication Data
US 2020/0036691 A1    Jan. 30, 2020

(30) Foreign Application Priority Data
Mar. 17, 2017 (GB) ..................... 1704334

(51) Int. Cl.
*H04L 29/06* (2006.01)
*H04L 9/16* (2006.01)
(52) U.S. Cl.
CPC ............ *H04L 63/0478* (2013.01); *H04L 9/16* (2013.01); *H04L 63/0869* (2013.01); *H04L 2209/046* (2013.01)
(58) Field of Classification Search
CPC .................................................. H04L 63/0478
See application file for complete search history.

(56) References Cited

U.S. PATENT DOCUMENTS 5,479,514 A * 12/1995 Klonowski ............... H04L 9/32
380/277
6,917,974 B1    7/2005 Stytz et al.
(Continued)

OTHER PUBLICATIONS

GB Search Report; GB Application No. GB1704334.0; dated Jul. 28, 2017.
(Continued)

*Primary Examiner* — Shawnchoy Rahman
(74) *Attorney, Agent, or Firm* — Polsinelli PC

(57) ABSTRACT

A computer implemented method of exchanging first valuable data at a first node for second valuable data from a second node, the method comprising the steps of:
applying a first encryption to a first plurality of messages, at the first node, with a function having a commutative property, so as to create a blinded first plurality of messages;
sending the blinded first plurality of messages from the first node to the second node, wherein the first valuable data is concealed in one message of the blinded first plurality of messages;
receiving a blinded second plurality of messages at the first node, wherein the second valuable data is concealed in one message of the blinded second plurality of messages and the blinded second plurality of messages have been encrypted with a second encryption;
in response to receiving the blinded second plurality of messages at the first node, applying a third encryption to the blinded second plurality of messages with a function having a commutative property so as to create double blinded second plurality messages which have been encrypted with at least the second encryption and the third encryption;

(Continued)

sending the double blinded second plurality messages from the first node to the second node;

subsequent to sending double blinded second plurality messages from the first node to the second node, receiving double blinded first plurality messages at the first node, wherein the double blinded first plurality of messages have been encrypted with at least the second encryption and a fourth encryption;

in response to receiving double blinded first plurality messages at the first node, removing the first encryption of the second plurality of double blinded messages to provide partially decrypted blinded first plurality of messages which remain encrypted with the third encryption;

after removing the first encryption, sending at least one message of the partially decrypted blinded first plurality of messages to the second node;

subsequent to sending at least one message of partially decrypted blinded first plurality of messages to the second node, receiving at least one partially decrypted message which is one of the second plurality of messages with the second encryption removed; and in response to receiving at least one partially decrypted message, exchanging with the second node further partially decrypted messages of the first and second plurality of messages.

31 Claims, 9 Drawing Sheets

(56) References Cited

U.S. PATENT DOCUMENTS

| 10,341,100 | B2* | 7/2019 | Mullins | H04L 9/0833 |
| 10,826,875 | B1* | 11/2020 | Kim | H04L 63/0428 |
| 2007/0011453 | A1 | 1/2007 | Tarkkala et al. | |
| 2020/0044865 | A1* | 2/2020 | Ward | G06F 21/73 |

OTHER PUBLICATIONS

International Search Report and Written Opinion; PCT Application No. PCT/GB2018/050698; dated May 15, 2018.

A. W. Roscoe et al, "Auditable PAKEs: Approaching Fair Exchange Without a TTP", Mar. 13, 2017 (Mar. 13, 2017), p. 1-24, Retrieved from the Internet: URL:http://www.cs.ox.ac.uk/files/9014/AP10.pdf XP055472582 [retrieved on Sep. 6, 2019].

A. W. Roscoe, "Detecting Failed Attacks on Human-Interactive Security Protocols", Feb. 7, 2016 (Feb. 7, 2016), p. 1-15, Retrieved from the Internet: URL:http://www.cs.ox.ac.uk/files/8112/detattpub.pdf XP055472585 [retrieved on Sep. 6, 2019].

* cited by examiner

SECURE DATA EXCHANGE

CROSS-REFERENCE TO RELATED APPLICATIONS

This application is a national stage entry of PCT/GB2018/050698 filed Mar. 16, 2018, which claims priority to GB 1704334.0, both applications are expressly incorporated herein in their entireties.

FIELD OF THE INVENTION

The invention relates to the exchange of data between nodes. In particular, but not exclusively, the invention relates to the stochastic fair exchange of data without a Trusted Third Party (TTP).

BACKGROUND OF THE INVENTION

It is known that communication between two nodes may be vulnerable to attacks by third parties. In communication between two nodes, an attack may be instigated by a third party node masquerading as a legitimate party (an imposter), or by a third party node implementing a man-in-the-middle attack, whereby the third party intercepts information from two legitimate nodes and controls the information passed between the legitimate nodes.

In the situation where two parties wish to exchange information (which may be, for example, an exchange of valuable data such as an exchange of values confirming the two parties share the same password or an exchange of contracts), there is a vulnerability to attack because exact simultaneous exchange of data is impossible. Consequently, a first party shares information with a second party before the second party shares its information with the first party. This means that an attacker can disguise attempted guessing attacks as network communication failures. The attacker can arrange the attack so that he learns whether his guess is good before the legitimate participant(s) learn of a confirmation failure. When the attacker learns that his attack has failed, i.e. that his guess was wrong, he can block subsequent messages. When the attacked party times-out, there is no difference in what it will have seen compared to a communications failure at the same point in the protocol.

Some protocols, such as password authenticated key exchanges (PAKEs), are in particular vulnerable to guess and abort style attacks: an attacker attempts a protocol run with a legitimate party and aborts as soon as he knows that his guess at the password is false. By suitable choice of role and timing the attacker can ensure that the legitimate party does not hold enough information to determine whether she has been interacting with an attacker or has simply been the victim of a network failure.

With the strategy of making failed guesses look like communications failures, the attacker can expect to increase his chances of success, by allowing him to make more attempts before the legitimate parties start to suspect an attack and take evasive action. Such a strategy would be particularly effective where the attacker attacks many nodes in parallel.

It is known that complete fair exchange of data, where one party gets what they want if and only if the other party or parties do also, is not possible without a Trusted Third Party (TTP) or a majority of honest parties. However, the use of a TTP necessitates additional trust assumptions, introduces a bottleneck and single point of failure which makes it inappropriate for use in exchanges between two parties, for example password authenticated key exchanges (PAKEs), where key confirmation is desirable without having to establish communication through a third party.

It has previously been shown for example that Human-Interactive Security Protocols (HISPs) can be transformed using Roscoe's transformation, as described in WO Patent Application Number PCT/GB2017/080111 and the paper 'Detecting failed attacks on human-interactive security protocols' by A. W. Roscoe. This is achieved by using the construct delay(x, T) which allows users to put the data x beyond anyone's reach for time T, but which the users themselves can eventually open. A protocol is said to be auditable if the legitimate players can distinguish online guessing (or other) attacks from network failures.

It would be desirable for it to be likely for attempted attackers to be spotted rather than for them to be more likely to be assumed to be genuine network failures.

It has been found that for certain protocols with significant differences from HISPs, Roscoe's transformation may not overcome certain vulnerabilities to particular attacks. For example, if there is no out-of-band channel and a requirement to keep passwords secret, it is much harder for two nodes to discriminate between a mistake they may have made and an attack. If Alice (A) simply types in the wrong password, Bob (B) may think he is being attacked.

Further, if a long term shared secret state is employed (the password between a pair of parties—contrasting with HISPs where all runs are completely independent), it follows that even though an attack may have little chance of succeeding in the sense of getting a faked connection for the attacker on the same session, it may reveal useful things to him about the long term state. This difference means that it is not possible to simply apply known transformations developed for HISPs, to protocols with long term shared secrets, in order to render them auditable.

While the application of Roscoe's transformation can prevent an attacker successfully carrying out a one-off attack that simultaneously carries no chance of revealing the attacker and yet gives him a chance of completing a connection, it does not prevent one that can possibly reveal the password to be used in a second session. That is because known HISP transformations send data to allow comparison under a delay that opens too late to complete the present session: this prevents the attacker getting any useful information about whether this attack will succeed or fail. Nor does it assist in future attacks, since no state is shared between HISP runs. However, the attacker of a protocol with a long term shared secret can afford to wait for this delay to open when he aborts immediately after receiving it: if his password guess was right or wrong in this session it will also be right or wrong in the next.

Exchange protocols, such as PAKEs, provide a way to establish secure channels in the absence of a Public Key Infrastructure (PKI), without requiring empirical channels as is the case for HISPs. Instead, they rely on the parties having a previously shared, low-entropy secret: such as a password or similar. It is assumed that the parties have been able to previously agree this secret via some authenticated, private channel, e.g. meeting in person over a cocktail. This password is used repeatedly in authenticating future session key establishment protocol runs. Accordingly, the use of a long time shared secret involves a key establishment phase that is followed by a key confirmation phase that allows the parties to confirm that they have computed the same key, thus providing implicit authentication. Note that the key-establishment and key confirmation phases may overlap: the first party to reach a state where it can compute the session can issue key confirmation data along with key establishment data in the next emitted message.

Known PAKEs follow the same high-level pattern: some key establishment steps, typically Diffie-Hellman based, with the password s folded into the calculation of the session key in some way. Thus, each party contributes fresh, high-entropy values and the session key is computed as a function of this fresh entropy and the low-entropy password. If the messages are not corrupted and both parties used the same password, they will compute the same session key.

As a result, PAKEs are structurally quite different to HISPs and as a consequence the technique used to render HISPs auditable is not enough to achieve complete auditability in PAKEs. In essence this is because PAKEs, unlike HISPs, have persistent state (the password) that needs to be protected between runs.

An example of this vulnerability is illustrated here using Roscoe's transformation on a Simple Password Exponential Key Exchange (SPEKE) protocol with key confirmation. The SPEKE protocol is as follows:

1. A→B : X :=hash$(s_A)^{2x}$
2. B→A : Y :=hash$(s_B)^{2y}$

A computes $K_A$=K=$Y^x$=hash$(s_B)^{2yx}$ and B computes $K_B$=K=$X^y$=hash$(s_A)^{2xy}$.

3. A→B : hash$_1$($K_A$, A, B)
4. B→A : hash$_2$($K_B$, A, B)

Here the first two messages allow A and B each to compute a proposed key based on their respective values $s_A$ and $s_B$ of the shared secret. The key feature of SPEKE is that the Diffie-Hellman (DH) generator is not publicly known but rather is computed by the parties as a function of the password, hence K is a function of the password. The final two messages allow them to confirm that they have computed the same K and hence, with high probability, $s_A$=$s_B$, implying that they have each been running the protocol with the intended party. The functions hash, hash$_1$ and hash$_2$ are different cryptographic hash functions.

Note that the agent playing the role of Bob (B) receives Message 3, the one which confirms (if true) that the party she is running the protocol shares knowledge of the password $K_A$ (=$K_B$), before Alice (A) gets the reverse confirmation, provided by Message 4. Thus, if "Bob" is actually fraudulent and has made a guess at the password, he will discover if this guess is correct before he has to send the message that will give Alice the same information. If this guess was correct, he will carry on, and Alice will be (incorrectly) convinced of the authentication. If it was not, he can abandon the run at this point and Alice will have no direct evidence of the attacker's presence: all she sees can be explained by a communications failure.

In contrast to a similar situation for HISPs it is easier for the attacker because there is no need for the real Alice and Bob both to be present. The danger is that the attacker may be able to perform repeated attacks without the participants being sure that they are subject to attack. In the case of protocols with long term persistent states he can potentially attack both of the owners of a password separately, doubling his chance of obtaining it.

Even if a legitimate party in such a protocol reached the point at which she sees that the computed keys do not match, there may be an innocent explanation: that one of the parties mistyped their password. However, it is assumed here that a password mismatch in any run is indicative of an attack.

It would be advantageous to implement a transformation of protocols that ensures that the legitimate parties can distinguish with high probability any online guessing attack from a communications failure of the network. The legitimate parties will therefore be able to take remedial action and warn others.

The application of Roscoe's transformation to the SPEKE protocol would replace the final two messages by the following sequence:

3. A→B :delay(hash$_1$($K_A$, A, B),T)
4. B→A :hash$_2$($K_B$, A, B)
   A :intime(hash$_1$($K_A$, A, B))
5. A→B :hash$_1$($K_A$, A, B)

in which the first message is sent delayed so that B must send his confirmation before he can know whether the delayed confirmation from A was correct or not. There is no need for B to check that the correct value was delayed in Message 3 if he gets the correct Message 5 here. This would have not have been the case if the third and fourth messages of the original protocol were H(H($K_A$)) and H($K_B$), namely nested hashing, because the former can be computed from the latter in the case where $K_A$=$K_B$ without knowledge of $K_B$. Since opening delays is potentially expensive, this explains why the form of confirmation messages used was selected.

If B is an attacker, he has no chance of using a correct guess at the password to obtain connection in this run without giving away his presence (if is guess was wrong) by sending Message 4. The same holds if A is an attacker, because she has had to give away the delayed version of the confirmation for Bob to continue to Message 4, If she sent it honestly, Bob will be able to open the delay eventually and discover if her password guess was correct, and if she sends a wrongly formatted Message 3 this will also give her away.

On the other hand, Bob as attacker can now simply accept Message 3 and then abandon the run. This particular run will fail to complete, but he can wait for delay(H($K_A$,A),T) to open and thus find out if his guess $s_B$ at the shared secret was correct. Thus, he can either use the password in a future run, or reduce his search space for future attempts. No similar strategy is useful for HISPs.

A further difficulty with protocols using a long term persistent state is that, in contrast to HISPs, the security level cannot be varied dynamically: in HISPs the length of a digest can be increased when there is evidence or suspicion of attack attempts. If there is a password pre-agreed by Alice and Bob, it cannot be changed easily: essentially the only way of reducing the likelihood of an attack in the presence of a known attacker is to restrict or ban use of the protocol.

In all standard PAKEs, the issue of who sends this type of information first is determined by which role a participant in playing: Alice or Bob. Note that the difficulty with the transformed SPEKE above is that the attacker knows exactly at what point he has the relevant information and so he can abort as soon as he reaches this point, even if the information is temporarily inaccessible to him due to a delay wrapper.

It is clear that in performing this type of fishing-for-information attack, it is necessary to play the role of the first of the two parties who gets the confirmation message in a protocol such as that of a PAKE (the responder B in the case of our SPEKE/key confirmation example above).

SUMMARY OF THE INVENTION

In order to mitigate for at least some of the above-described problems, there is provided: A computer implemented method of exchanging first valuable data at a first node for second valuable data from a second node, the method comprising the steps of: applying a first encryption to a first plurality of messages, at the first node, with a function having a commutative property, so as to create a blinded first plurality of messages; sending the blinded first plurality of messages from the first node to the second node, wherein the first valuable data is concealed in one message of the blinded first plurality of messages; receiving a blinded second plurality of messages at the first node, wherein the second valuable data is concealed in one message of the blinded second plurality of messages and the blinded second plurality of messages have been encrypted with a second encryption; in response to receiving the blinded second plurality of messages at the first node, applying a third encryption to the blinded second plurality of messages with a function having a commutative property so as to create double blinded second plurality messages which have been encrypted with at least the second encryption and the third encryption; sending the double blinded second plurality messages from the first node to the second node; subsequent to sending double blinded second plurality messages from the first node to the second node, receiving double blinded first plurality messages at the first node, wherein the double blinded first plurality of messages have been encrypted with at least the second encryption and a fourth encryption; in response to receiving double blinded first plurality messages at the first node, removing the first encryption of the second plurality of double blinded messages to provide partially decrypted blinded first plurality of messages which remain encrypted with the third encryption; after removing the first encryption, sending at least one message of the partially decrypted blinded first plurality of messages to the second node; subsequent to sending at least one message of partially decrypted blinded first plurality of messages to the second node, receiving at least one partially decrypted message which is one of the second plurality of messages with the second encryption removed; and in response to receiving at least one partially decrypted message, exchanging with the second node further partially decrypted messages of the first and second plurality of messages.

Further aspects of the invention will be apparent from the description and the appended claims.

DETAILED DESCRIPTION OF AN EMBODIMENT OF THE INVENTION

A detailed description of embodiments of the invention is described, by way of example only, with reference to the figures, in which.

Figure 1:
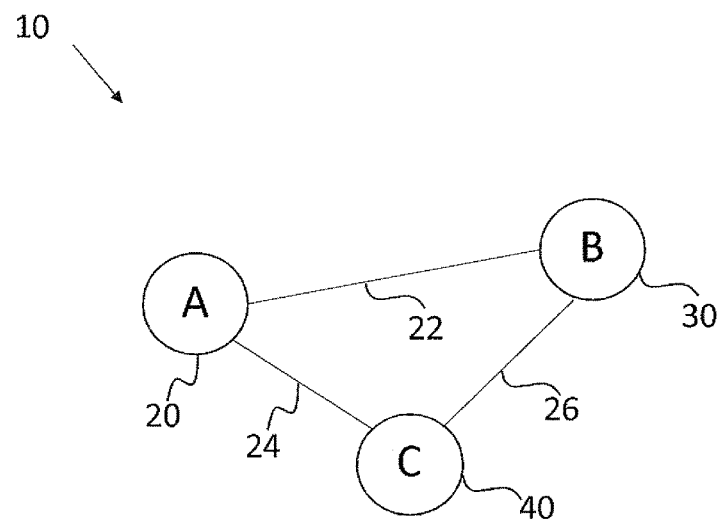
FIG. 1 is a schematic showing how an attack might be implemented.

FIG. 1 is a schematic 10 showing how an attack might be implemented on a two party protocol. There are two nodes, node A 20 and node B 30, which can communicate with each other over communication pathway 22. Node A 20 and node B 30 are legitimate nodes that are configured to exchange data and to perform protocols. There is also shown a third node, node C 40. Node C 40 is an attacker. Node C 40 is shown in communication with node A 20 over communication pathway 24. Node C 40 is also shown in communication with node B 30 over communication pathway 26. Node C 40 can perform an attack by pretending to be node B 30 when communicating with node A 20. Node C can perform an attack by pretending to be node A 20 when communicating with node B 30. Node C can also perform a man-in-the-middle attack by interposing itself between node A 20 and node B 30, thereby to control the information passed between node A 20 and node B 30.

Whilst FIG. 1 shows an example of a node C 40 attacking a two-party protocol, alternatively any number of nodes may be used to attack a protocol, which may be a multi-party protocol with any number of nodes. An attack can also originate from node A 20 or node B 30 in that one of the nodes that is legitimately invited to perform fair exchange may attempt to obtain valuable data from the other node without offering their own valuable data in return and use a break in communications (which may look like a network failure) to hide this attempt from the other node.

Figure 2:
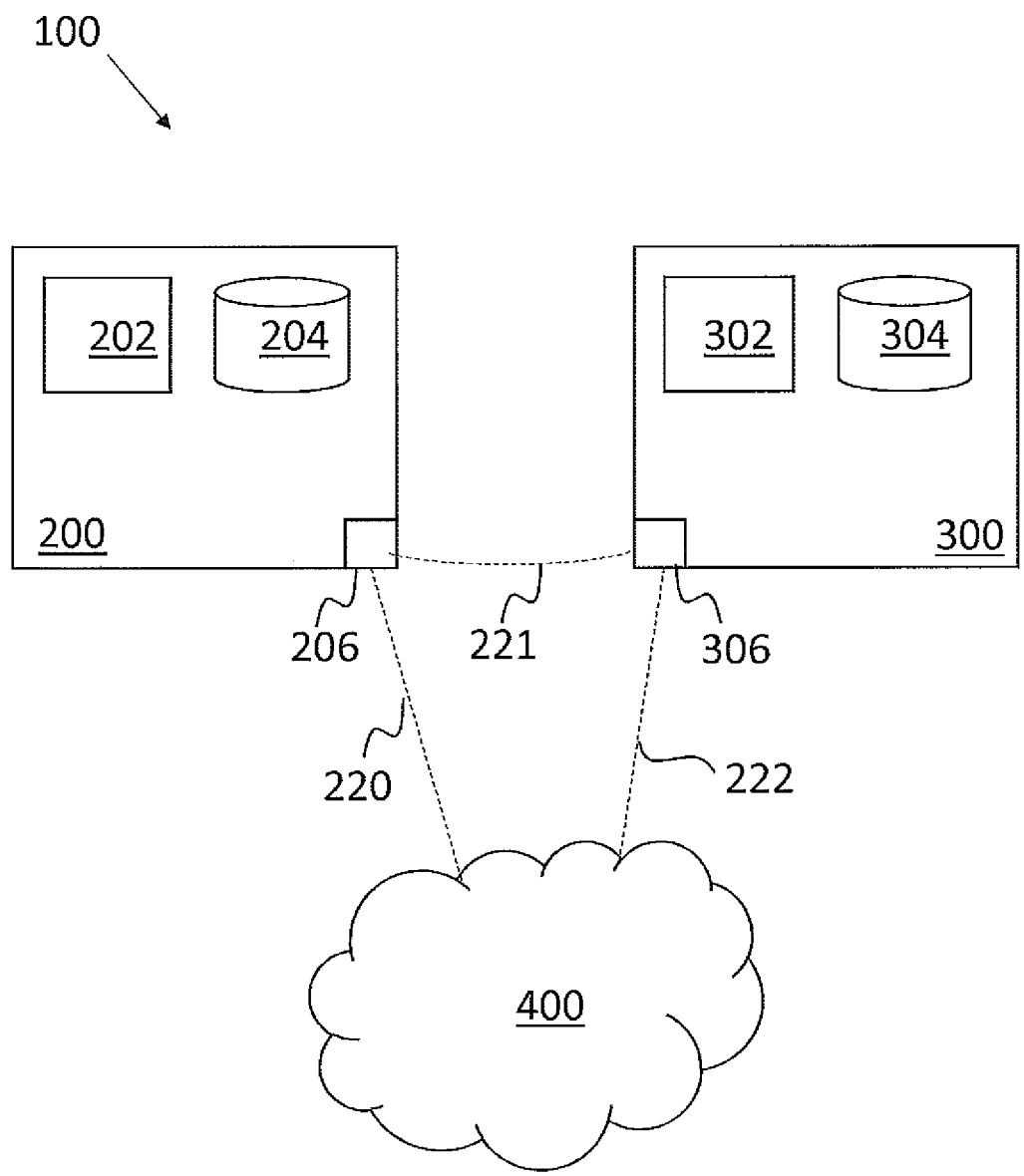
FIG. 2 is a schematic showing communication between two nodes.

FIG. 2 shows a schematic 100 of a first node 200 in communication with a second node 300. The first node 200 may be the same as node A 20 of FIG. 1. The second node 300 may be the same as node B 30 of FIG. 1. The first node 200 and the second node 300 are configured to perform an exchange protocol. The exchange protocol is described in more detail below.

The first node 200 has a processor 202, a memory 204 and a communication interface 206. The second node 300 has a processor 302, a memory 304 and a communication interface 306. The first node 200 is shown in communication with the second node 300 via a network 400. The first node 200 communicates with the network 400 via a communication pathway 220 between the first communication interface 206 and the network 400. The second node 300 communicates with the network 400 via a communication pathway 222 between the second communication interface 306 and the network 400. The first node 200 is also shown in direct communication with the second node 300 over communication pathway 221. Communication pathway 221 may be an empirical channel, used in order to establish a password between the first node 200 and the second node 300, for example.

The illustrated network 400 is the internet. Alternatively, the network 400 is any network that enables communication between the first node 200 and the second node 300.

As described above, it is desirable to achieve the fair exchange of valuable data $V_A$ and $V_B$ (which could be confirmation values in the example of a PAKE protocol, might be cryptographic keys which can be used to decrypt and access other valuable data, or might be financial data, or legal contracts). It is desirable that a node, such as the second node 300 of FIG. 2 (node B) would get valuable data $V_A$ if and only if a node, such as the first node 200 of FIG. 2, (node A) gets valuable data $V_B$ from another node, such as the second node 300 of FIG. 2 (node B). It is assumed that these valuable data can be revealed publicly at appropriate junctures without giving away information such as a key: they may, for example, be hashed versions of the two sides' keys.

As also described above, completely fair exchange, where one party gets what they want if and only if the other party or parties do also, is not possible without a Trusted Third Party (TTP) or a majority of honest parties. Some of the following embodiments provide the means to get close to achieving what can be termed stochastic fairness: preferably providing that probability of each party getting what it wants from an aborted exchange is equal.

Figure 2A:
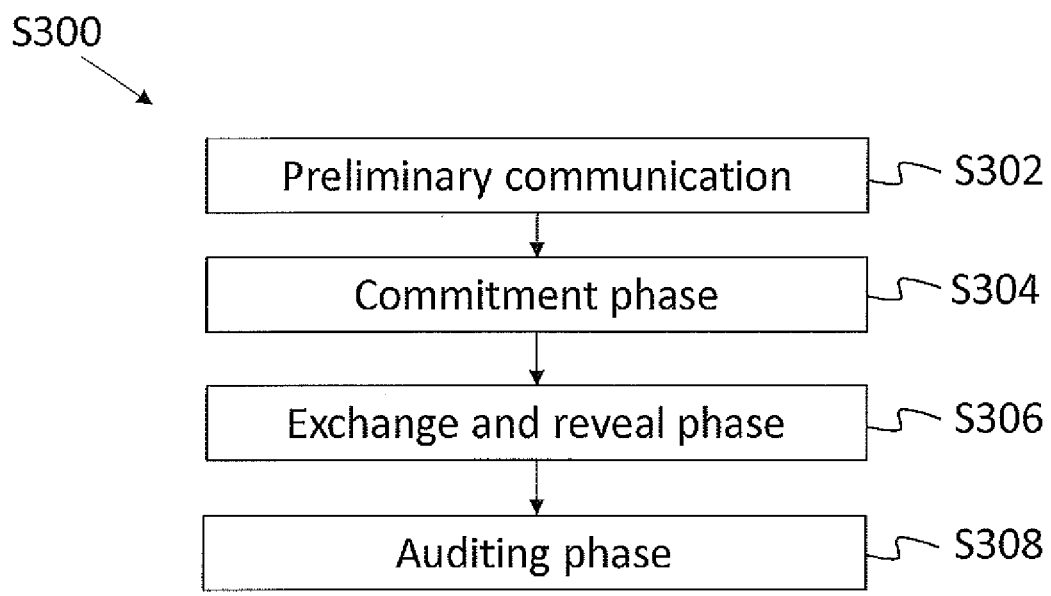
FIG. 2A is a flow chart showing phases of an exchange protocol between two nodes.

FIG. 2A is a flow chart of an exchange protocol process S300 that shows the phases of communication between a first node 200 and a second node 300 that are performed as part of its exchange protocol. The process starts at step S302, where preliminary communication between a first node 200 and a second node 300 is initiated. An example of preliminary communication is described below in more detail, with reference to FIG. 3. The preliminary communication between the first node 200 and the second node 300 provides a plurality of messages, most of which may not contain any valuable data, in a manner to ensure that the exchange of valuable data between the first node 200 and the second node 300 has increased fairness.

The process then moves to step S304. Step S304 is a commitment phase and an example is described with more detail in reference to FIG. 4. However, the commitment phase S304 is optional and process S300 can be performed and provide technical advantages without it. The commitment phase S304 is used to commit the nodes to values that, when revealed at a later stage, aid in the auditing of the protocol in order to show if there are inconsistencies indicative of an attack and to help distinguish an attack from a network failure.

The process then moves to the exchange and reveal phase S306. At the exchange and reveal phase S306, the first node 200 and the second node 300 engage in the exchange of messages that were set up during the preliminary communication S302. Accordingly, in the case that the first node 200 and the second node 300 are both trustworthy nodes, they will fairly exchange their valuable data. It is during this stage it can become apparent if one of the nodes does not fairly exchange data and is performing an attack. Alternatively, it is during this phase that an attacker may try to abort the process and hope/plan to do so after they have obtained valuable data (or simply gathered information about it) but before it is apparent to the other node that they have not, or were not able to, provide the valuable data expected by the other node. Where an attack is suspected the process moves to step S308, where an auditing phase is entered. During the auditing phase, the information exchanged by the first node 200 and the second node 300 can be analysed in order to determine if an attack is likely to have taken place, or if it was simply a communication failure and the exchange protocol would otherwise have been completed. In the standard situation, where the reveal phase S306 completed successfully and both nodes obtained the valuable information they intended to from the exchange, the auditing phase may not be needed.

Figure 3:
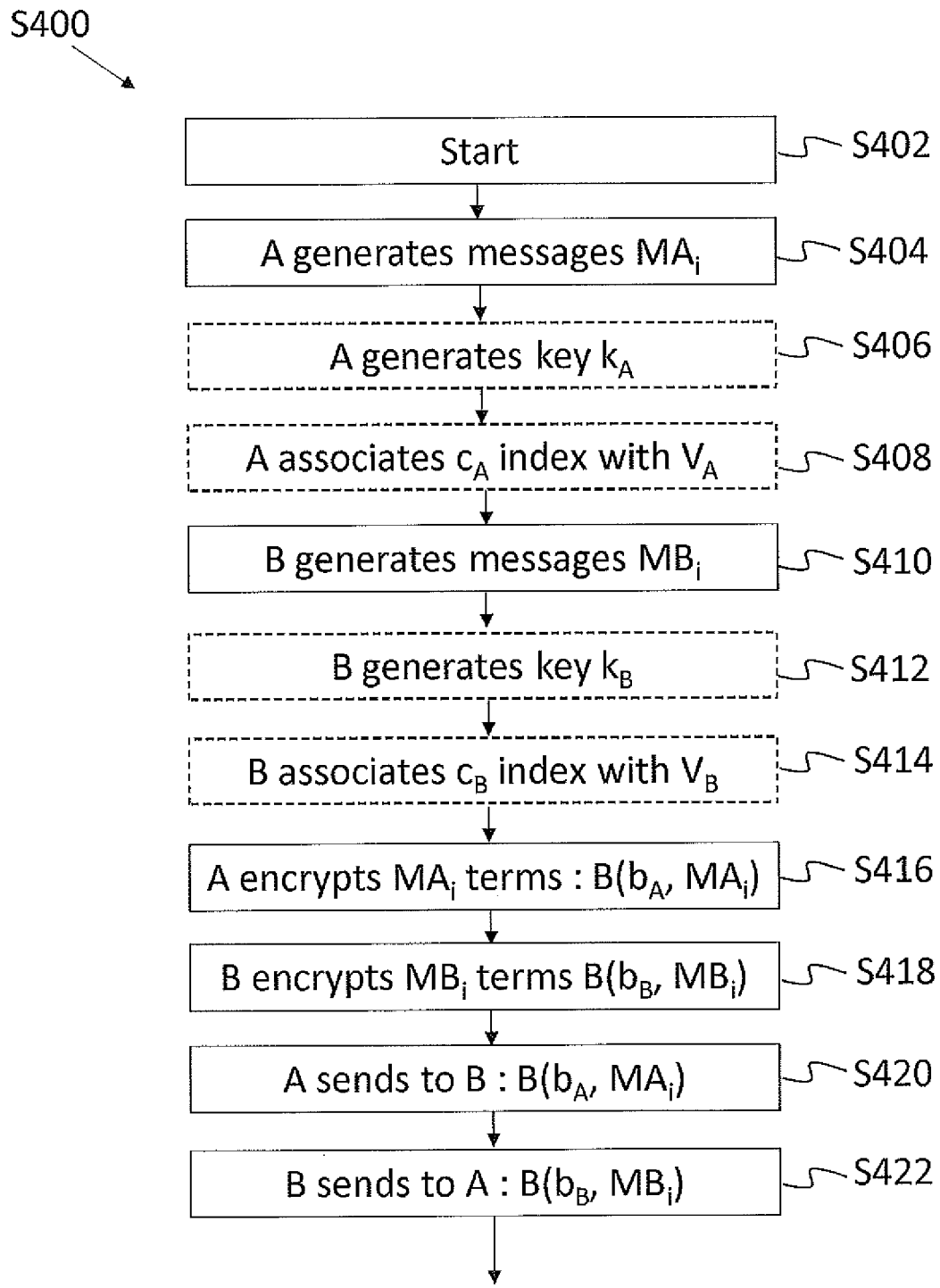
FIG. 3 is a flow chart showing preliminary steps of an exchange protocol.
Figure 3:
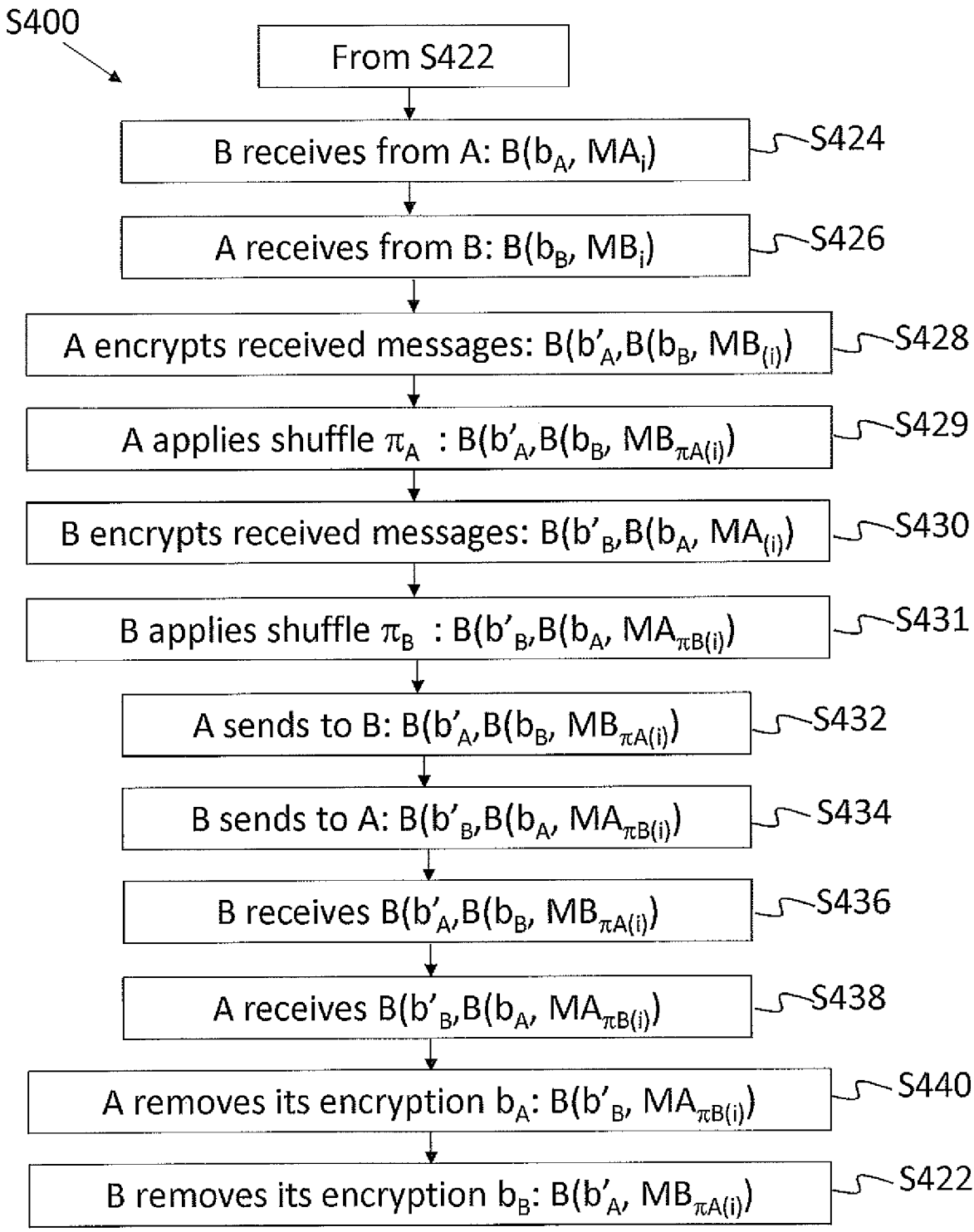

FIG. 3 shows a flow chart S400 showing an example of preliminary steps of a communication protocol between a first node and a second node. The first node may be the first node 200 of FIG. 2. The second node may be the second node 300 of FIG. 2. The first node 200 and the second node 300 may engage in an exchange protocol, where each of the first node 200 and the second node 300 wishes to obtain valuable data from the other node.

The process commences at step S402, where the phase and process S300 is initiated. The process is initiated by preliminary communication between node A (which is, for example, the first node 200 of FIG. 2) and node B (which is, for example, the second node 300 of FIG. 2).

The process moves to step S404, where the first node 200 generates a number n of messages $MA_i$, where n is greater than 1 and typically much greater. One message of the plurality of messages $MA_i$ contains valuable data $V_A$, and in the case where the valuable data $V_A$ is a confirmation value in a PAKE protocol, for example, allow the second node 300 to determine whether $V_A = V_B$ (i.e. the confirmation values of the first node 200 and the second node 300 match). The valuable data $V_A$ may be an end point and desired data in itself or may, given the second node 300's knowledge up to that point (and without the other messages $MA_i$), allow the second node 300 to determine actual desired valuable data such as by use of a cryptographic key.

Whilst the first node 200 generates one message that contains the valuable data $V_A$, it also generates other messages that do not contain, nor enable, the valuable data $V_A$ to be determined by the second node 300. There are therefore n–1 other messages generated by the first node 200, where n is a natural number describing the number of messages in the plurality of messages $MA_i$ (i.e. i=n).

The process moves to step S406, where optionally the first node 200 generates a key $k_A$. The key $k_A$ is used as a key to determine the valuable data $V_A$ in the event that the valuable data $V_A$ is sent in an encrypted form reliant on the key $k_A$. The valuable data $V_A$ may be sent in hashed form in order to commit the first node 200 to the data, whilst providing the means for the data to be audited in the event that the protocol is aborted. This step is typically provided if process S300 uses an efficient delay mechanism described below. It is, however, possible to use alternative delay mechanism (such as by using phase S700 described below) without step S406 or to not provide a delay mechanism at all and thereby forgo step S406. When step S406 is provided then all of the messages $MA_i$, or at least a portion of them, are/is encrypted using key $k_A$ as well as using the blinding functions mentioned below. Consequently key $k_A$ is needed by node B in order to read valuable data $V_A$.

The process optionally moves to step S408 where the first node 200 associates an index value the plurality of message $MA_i$ with the valuable data $V_A$. The first node 200 chooses a random index $c_A$ from $\{1 \ldots n\}$ that indicates which of the n messages will carry the valuable data $V_A$. The other n–1 terms are dummy terms. The index value $c_A$ commits the valuable data $V_A$ to a particular message. This means that an exchange protocol can be audited to determine whether the specific message that was committed to an index value does indeed hold the valuable data. This step can be particularly useful where an attacker attempts to generate a series of messages which all resemble messages that do contain, nor enable, the valuable data, to be determined by the second node, rather than provide a false value for the valuable data.

The process then moves to step S410, where the second node 300 generates a plurality of messages $MB_j$. The second node generates the same natural number of messages as the first node 200 generates (i.e. i=j). Whilst the second node 300 generates one message that contains the valuable data $V_B$, it also generates other messages that do not enable the valuable data $V_B$ to be determined by the first node 200. There are therefore n–1 other messages generated by the first node 200, where n is a natural number.

Alternatively, the first node 200 and the second node 300 create different natural numbers of messages (i.e. i≠j). One message of the plurality of messages $MB_j$ will, given the first node 200's knowledge up to that point will contain the valuable data VB, and, in the case where the valuable data $V_B$ is a confirmation value in a PAKE protocol, for example, allow the first node 200 to determine whether $V_A = V_B$ (i.e. the confirmation values of the first node 200 and the second node 300 match).

The process then moves to step S412, where the second node 300 generates a key $k_B$. The key $k_B$ is used as a key to determine the valuable data $V_B$ in the event that the valuable data $V_B$ is sent in an encrypted form reliant on the key $k_B$. The valuable data $V_B$ may be sent in hashed form in order to commit the second node 300 to the data, whilst providing the means for the data to be audited in the event that the protocol is aborted. Step S412 may be omitted in a similar manner to step S406.

The process may then move to step S414, where the second node 300 associates an index value of the plurality of messages $MB_i$ with the valuable data $V_B$. The second node 300 chooses a random index $c_B$ from $\{1 \ldots k\}$ that indicates which of the n messages will carry the valuable data $V_B$. This step is equivalent to step S408.

In each case exactly one of these messages will, given the other's knowledge up to that point (and without the other $MA_j$ or $MB_j$), reveal the value of (respectively) $V_A$ or $V_B$ or, in the case where it is intended that $V_A$ and $V_B$ are equal, allow the receiving agent to discover this.

As an example, in an exchange protocol the parties first create their $MA_i$ and $MB_j$ and keys $k_A$ and $k_B$. They then respectively choose k−1 alternatives $WA_i$ and $WB_j$ to $V_A$ and $V_B$, Each chooses at random an index $c_X$ from $\{1, \ldots, k\}$ that will indicate which of the k messages will carry the $V_X$ value; the other terms will be dummies. The $MA_i$ then become $\{V_A\}k_A$ and the $\{WA_i\}k_A$ and mutatis mutandis for B. k=∈R K and $c_A \in R \{1, \ldots, k\}$ and sets $MA_c:=\{V_A\}k_a$. A now generates k−1 values $MA_i$, $i \in \{1, \ldots, k\} \setminus \{cA\}$.

The process then moves to step S416. At step S416, the first node 200 encrypts the $_{MAi}$ terms using a blinding function to provide $B(b_A, MA_i)$. All of the terms $MA_i$ are preferably encrypted with the same blinding function $b_A$, so that the blinding function $b_A$ can subsequently be stripped from double-blinded messages.

The blinding function applies an encryption B(b,M) to M and is chosen has the properties:
 (i) receiving multiple messages encrypted under the same key does not significantly diminish security (as it would with Vernam, for example) and
 (ii) B(b1,B(b2,M))=B(b2,B(b1,M)) for all M, b1 and b2

Therefore, the blinding function is an encryption function with a commutative property. An example of a function that may be used for such a blinding is exponentiation in a suitable Diffie-Hellman type group, i.e. one in which taking discrete logs is deemed intractable.

The process then moves to step S418. At step S418, the second node 300 encrypts the $MB_i$ terms using a blinding function to provide $B(b_B, MB_i)$. All of the terms $MB_j$ are encrypted with the same blinding function $b_B$, so that the blinding function $b_B$ can subsequently be stripped from double-blinded messages.

The process then moves to step S420, where the first node 200 sends the blinded plurality of messages $B(b_A, MA=)$ to the second node 300. The process then moves to step S422, where the second node 300 sends the blinded plurality of messages $B(b_B, MB_i)$ to the first node 200.

The process continues when the second node 300 receives the plurality of blinded messages $B(b_A, MA_i)$ at step S424 and the first node 200 receives the blinded plurality of messages $(B(b_B, MB_j)$ at step S426.

Thus the first node 200 (node A) now has all the messages MB=created by the second node 300 (node B), though blinded under $b_B$, and vice-versa. These messages, because they are blinded, reveal nothing about $V_A$ or $V_B$, and because the index of the crucial member of this list is kept secret, the recipient does not know which, if unblinded, would reveal these values.

In an example, node A generates a blinding function $b_A$ and blinds the $MA_i$ terms: $B(b_A, MA_i)$. Node B performed the analogous actions and they now exchange their lists of blinded terms:
A→B : $<B(b_A, MA_i)|i \leftarrow 1 \ldots k>$
B→A : $<B(b_B, MB_i)|i \leftarrow 1 \ldots k>$ In response to receiving the blinded plurality of messages $B(b_B, MB_i)$, at step S428, the first node 200 encrypts the messages by applying a further blinding function $b'_A$, to provide a double-blinded plurality of messages $B(b'_A, B(b_B, MB_i))$.

The process then moves to step S429, where the first node 200 applies a permutation function $\pi A$ to the double blinded plurality of messages $B(b'_A, B(b_B, MB_i))$ to provide a shuffled set of messages $B(b'_A, B(b_B, M_{B \pi A(i)}))$.

In response to receiving the blinded plurality of messages $B(b_A, MA_i)$, at step S430, the second node 300 encrypts the messages by applying a further blinding function $b'_B$ to provide $B(b'_B, B(b_A, MA_i))$.

The process then moves to step S431, where the second node 300 applies a permutation function $\pi_B$ to the double blinded plurality of messages $B(b'_B, B(b_A, MA_i))$ to provide a shuffled set of messages $B(b'_B, B(b_A, M_{B \pi B(i)}))$.

The process then moves to step S432, where the first node 200 sends the shuffled double-blinded messages $B(b'_A, B(b_B, M_{B \pi A(i)}))$ to the second node 300.

The process then moves to step S434, where the second node 300 sends the shuffled double blinded messages $B(b'_B, B(b_A, M_{B \pi B(i)}))$ to the first node 200.

At step S436, the second node 300 receives the shuffled double blinded messages $B(b'_A, B(b_B, M_{B \pi A(i)}))$ from the first node 200.

At step S438, the first node 200 receives the shuffled double blinded messages $B(b'_B, B(b_A, M_{B \pi B(i)}))$ from the second node 300.

Therefore, in an example, node A applies a further blinding $b'_A$ to the terms she received from B to give $B(b'_A, B(b_B, MB_i))$ and applies a secret shuffle $\pi_A$ to the list. B performs the analogous steps and they now exchange these re-blinded, shuffled lists:
A→B : $<B(b'_A, B(b_B, MB\pi_{A(i)}))|i \leftarrow 1 \ldots k>$
B→A: $<B(b'_B, B(b_A, MA\pi_{B(i)}))|i \leftarrow 1 \ldots k>$ Now each can strip off their original blinding function, thanks to the commutativity of the blinding function, so now A holds the terms of the form $B(b'_B, MB_{\pi A(i)})$ and they then exchange the lists of $MA_i$ and $MB_j$ blinded and permuted as discussed below (so each sends and receives three lists in turn, with at the end A holding the $B(b_A, MA_j)$ in an order where neither knows where the terms holding $\{V_A\}k_A$ or $\{V_B\}k_B$ lie in either list.

The process then moves to step S440, where the first node 200 removes the encryption that it previously applied. At step S440, the blinding function $b_A$ is removed. This is enabled by the commutative property of the blinding function. The first node 200 therefore holds $B(b'_B, MA_{\pi B(i)})$. Such that the messages are now single blinded. The blinding that remains cannot be decrypted by the first node as does not know the blinding function $b'_B$ that was applied to the second node. This means that the first node cannot read which of the messages contains the valuable data $V_A$. Because of the shuffling step S431 node A cannot use the order of the messages to tell which contains valuable data $V_A$ even the message were originally sent in step S420 in a particular order.

The process then moves to step S422, where the second node 300 removes the encryption that it previously applied.

This is enabled by the commutative property of the blinding function. The second node 300 therefore holds B(b'$_A$, MB$_{\pi A(i)}$).

These messages, because they are blinded, reveal nothing about V$_A$ or V$_B$, and because the index of the crucial member of this list is kept secret, the recipient does not know which, if unblinded, would reveal these values.

Preferably, the first blinding function b$_A$ applied by the first node 200 is different from the second blinding function b'$_A$ applied by the first node 200. However, alternatively, b$_A$=b'$_A$. When b$_A$≠b'$_A$, it can be made easier to detect cheating by one of the nodes, for example by committing to binding functions and allowing them to be used in the auditing phase S308 as described below Preferably, the first blinding function b$_B$ applied by the second node 300 is different from the second blinding function b'$_B$ applied by the second node 300 to provide similar advantages. However, alternatively, b$_A$=b'$_A$.

Now the first node 200 (node A) and the second node 300 (node B) respectively hold B(b$_B$,MA$_i$) and B(b$_A$,MB$_i$), but in each case neither node can know which of these messages provides the revelation of the valuable data V$_A$ or V$_B$. An important step is then how these messages are passed over once more: note that if the second node 300 (B) receives B(b$_B$,MA$_i$) node B can unblind it to produce MA$_i$, meaning that exactly one of these messages will reveal V$_A$ to the second node 300 (node B), and vice-versa. This is a reveal phase, which is described below with reference to FIGS. 5 and 6. As far as each of the nodes is concerned, a random member of each list will do the revealing and neither has any idea which (either of the ones it is sending or the ones it is receiving).

The use of Vernam encryption would be insecure for blinding: nodes should use the same key in blinding all of the messages MA$_i$ because it does not matter which is which when unblinding them at step S440. As soon as the second node 300 (B) receives one of the B(k$_B$,MA$_i$) it can determine k$_A$ under Vernam because B(k$_A$,B(k$_B$,MA$_i$)) is already known. Because the first node 200 (A) has seen all the terms of the latter sort it is longer needed to participate in the exchange in order to determine all the MA$_j$ Flow chart S400 presents the steps in a standard and logical order. Alternatively steps which may be moved to be earlier or later than other steps providing they are not dependent on those steps. For example the second node 300 (B) may send the double blinded version of messages that originated from the first node 200 (A) (step S434) before it send its own blinded messages (S422).

This technique set out here is not a fair exchange in the classical sense, because either side can abort the exchange when either might unknowingly have made the reveal to the other. However it approximates what is termed stochastic fairness, meaning that in this case the probabilities of the reveal having been made either way is itself fair. Because of the particular approach that has been taken to swapping messages in the reveal phase (described below with reference to FIGS. 5 and 6), the agents will alternately have a k$^{-1}$ advantage in this probability.

This technique and the variants introduced below are referred to here as: 'stochastic exchange'. Two considerations of stochastic exchange are efficiency and preventing fraud by an imposter node, I, in what messages he sends. The former, as in the auditable protocols in International Patent Application Number PCT/GB2017/050111, can be helped by ensuring that delay(x,T) terms only need to be opened during the auditing process as opposed to normal complete protocol runs. The amount of cryptography (particularly with expensive functions) and number of messages sent and received have a major effect on efficiency. It follows that there will be a trade-off between how much work the parties do and how close they come to stochastic fairness.

The latter is achieved by commitment to subsequent sends in advance, on the assumption that the attacker does not want to be caught cheating. One way of achieving this is as follows: assume that the parties hold VA and VB which they wish to exchange.

Figure 4:
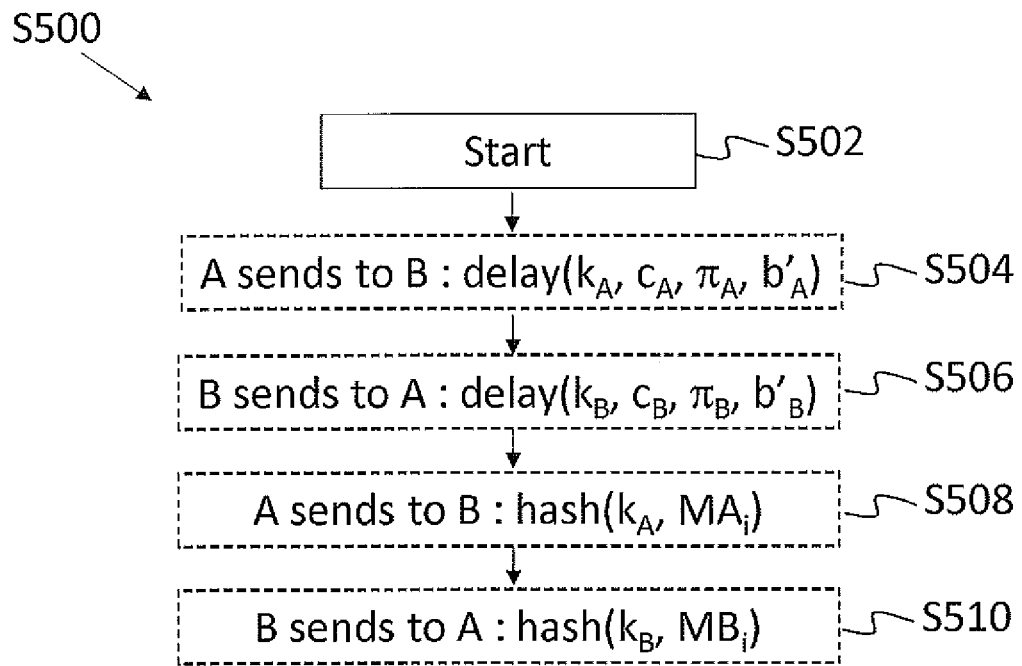
FIG. 4 is a flow chart showing a commitment phase of an exchange protocol.

FIG. 4 is a flow chart S500 showing an example commitment phase of the exchange protocol. The commitment phase is an optional phase that is used to bind the nodes to the things they send later.

There are several ways in which a node can commit to the valuable data that it sends. It can commit by sending crucial information in a delayed form. Alternatively or additionally, it can commit by associating an index value with the valuable data in the particular message within which the valuable data (as described with reference to FIG. 3) is concealed.

When an index is used to associate the valuable data to a particular message (as described with reference to steps S408 and S414 of FIG. 3), the commitment phase forces the nodes to commit to the index of the term that carries the valuable data, V$_A$ or V$_B$. Without such a commitment there can be a situation in which the protocol has aborted and a node does not know if the crucial message is amongst the set they have received to that point.

The commitment phase can be used to send delayed information between the first node 200 and the second node 300. The delayed information is not readable by the node receiving the delayed information until the exchange of messages has completed. The delayed information is used to determine the content of the messages that are sent in the preliminary phase, described above with reference to FIG. 3.

A delay mechanism might be implemented in a number of ways. Two that are possible for this application are:

(1) A global authority generates a series of asymmetric keys. It associates each one (pi,si) with a future time ti at which this key will open and broadcasts, signed, the pair (pi,ti). At time ti it broadcasts (again signed) the pair (pi,si). Thus any party can delay any message until time ti by encrypting it under pi, knowing that the broadcast of si at ti will then open M to anyone who has $\{M\}_{pi}$.

(2) A node creating a delay term applies an invertible function to M which requires a long sequential calculation to invert. There are several possibilities based on exponentiation.

The modification of protocols with delay mechanisms has previously been explained in relation to HISPs (e.g. the paper 'Detecting failed attacks on human-interactive security protocols' by A. W. Roscoe). Such delay mechanisms d typically provide for a key k to be received/known but not before a predetermined time T. Different delay mechanisms can be used and substituted for each other. A delay mechanisms d preferably includes a cryptographic primitive delay (x, t), with the following properties:

(1) Any device who knows delay(x, t) can gain knowledge of, or calculate x, but it the delay mechanism that is configured so that it is difficult to know/calculate x (and preferably as difficult as possible) until at least t units of time since its first creation).

(2) No device (that does not already know the value of x) can deduce anything about x from it before that point.

(3) In the same agent that created delay(x, T), the boolean intime(x) returns true if before T since the call of delay(x, T), and false otherwise.

(4) In the case that the value being delayed has less than 256 bits of entropy, additional random information analogous to the use of the random nonce X in the commit scheme referred to for Vaudenay-style protocols is added to prevent searching for collisions in the values of delay(x,T).

Depending on the means of opening a delay(x, t), this might also require significant computational resource to be incurred by nodes and this may slow the process as well as require energy. Consequently, it can be advantageous to use delay(x, t) in such a way that it does not have to be checked in a completed run of a protocol, but only when auditing a failed run.

It is desirable that the sort of devices running the protocols (e.g. nodes 200 and 300) are able (as part of the auditing process) to be able to open a value computed for delay (e.g. dS or dB) in a small multiple (say 10) of the time it will take an attacker with essentially unbounded computing resources to do this. To achieve this it is advantageous that the computation is sequential, in the sense that it is difficult/impossible to parallelise. Potential schemes may be based on a long sequence of operations. Three possibilities are:

(1) A large prime p of the form 3m+2 is chosen (these are exactly the primes in which cubing $x^3$ is invertible, the value determining a time delay t. delay(x, t)=$x^3$ mod p is fast to compute, but to uncover x from this it is necessary to compute $X^d$ mod p where d is chosen so that p−1 divides 3d−1. This will typically take ($\log_2$ p)/2 times longer to compute, namely a computational advantage proportional to the number of digits in p (the calculation of $x^3$ will clearly take more time, the more digits there are—note that there are multiplication algorithms faster than the usual "schoolbook" one that can be expected to give significant advantages when p is very long). To achieve a sufficient delay it may be necessary to make p very large indeed; as an alternative this operation could be repeated with several increasing primes in turn. The primes in this example could be published and used by all nodes. In cases where x has insufficient entropy to prevent searching attacks, it is preferably augmented by a suitable random nonce before the operations above are carried out.

(2) A known case where encryption is much cheaper than decryption is low-exponent RSA, where the encryption key is only a few digits long (sometimes e=3) and the decryption key d is the same order as the base N. This may not work well in case described because if an agent published ($X^e$, d) as delay(x, t), the use of a standardised e, or even an e chosen from a reasonably small range, would allow an attacker to deduce e and therefore the factorisation N=pq thanks to an attack on RSA set out in the prior art that shows that from (N, e, d) one can calculate (p, q) efficiently to a high probability. Even if this attack was too slow to unravel the factorisation the first time the base N was used, this would mean that N could not be re-used. Since the calculation of p and q is itself time-consuming, this makes this particular possibility unattractive.

(3) A downside with the above is that the exponent used by the creating agent is exposed because it is drawn from a small range. This problem can be avoided by using huge-exponent RSA instead, where huge means unnecessarily high. The idea here is that an RSA base N=pq is chosen, and delay(x, t)=(N, $x^e$,D), where D is an integer typically much larger than N (and may be efficiently presented as (d,r) representing D=d×$2^r$ for d a small integer). e is calculated from D in the usual manner of RSA but, as far as an outsider is concerned, will be drawn from a very large space and so not be searchable for. The lack of knowledge of p and q will mean that it is impractical to reduce D to a smaller, equivalent, exponent.

delay(x, t) is then $x^e$ mod N, which is opened by raising to the power D, coupled with N and D. N, and if desired (e, D) can be re-used by this agent, but the same attack as above where (p, q) are computed from (N, e, d) means that each agent must have its own N.

The phase is initiated at step S502. The phase is initiated before the exchange of messages between nodes (such as the first node 200 and the second node 300). This way, in the event that an exchange protocol is abandoned, it is possible to audit the abandoned protocol in order to ascertain whether the failure to complete the protocol arose from a communication failure, or an attack. If a legitimate attempt has been made to perform a protocol, even if a party does not receive the valuable data in the data exchange, it can check whether it would have had the data had the exchange completed, or if some exchange of messages has already occurred, whether the exchange of messages followed the pre-committed pattern.

At step S504, the first node 200 sends the key $k_A$, index number $c_A$ of the valuable data $V_A$, the applied shuffle $\pi_A$ and the second blinding function $b'_A$ in delayed form to the second node 300.

Alternatively, any of the key $k_A$, index number $c_A$, permutation $\pi_A$ and the second blinding function $b'_A$ can be sent in delayed form as part of the commitment phase. Advantageously, a key may be used to enable the valuable data to be read as described above at steps S406 and S408. By sending the key in delayed form, advantages of using a delay mechanism for the contents of the message described below can be achieved without having to use a delay mechanism for all of the messages (one of which will hold the valuable data). Given the computational power required to open a delay mechanism this has advantages terms of efficiency in reducing the number of mechanisms. Further use of the key is beneficial in enabling delay mechanisms to only need to be opened in an optional audit phase S308 rather than the reveal phase S306.

Sending the index $c_A$ can help to prevent an attacker from attempting to hide incorrect valuable data $V_A$ sent during an aborted process S300 by making it look like a dummy message. The commitment to $c_A$ will mean that the message which is supposed to contain $V_A$ can be found and analysed. If a delay mechanism such as delay of the key mentioned above, are used elsewhere then sending the index $c_A$ with a delay mechanism is preferable to prevent it from being used to discover information early. However, if no other delay mechanism are used and the index of the messages is hidden by the double blinding and shuffle steps (S428 to S431), then the index can be sent as clear text in step S504.

Advantageously, the use of delay mechanism means that an attacker would not be able to abort at the stage of the exchange protocol when they had received the valuable data that they were seeking without being certain that the other party would have a message revealing that valuable data received from the attacker was not the valuable data that they were seeking.

Advantageously, by delaying the second blinding function $b'_A$ and sending it from the first node to the second node, the second node will eventually have the information to determine whether or not the first node received the valuable data $V_B$ during exchange phase S306 Similarly by delaying but committing to b'$_B$ the first node can eventually determine whether or not they sent $V_A$ in the exchange phase S306. This can be useful because if an attack is detected is can be valuable to know if $V_A$ has been compromised or can be re-used. For example when applied to PAKEs knowing that $V_A$ has been sent to an attacker may prompt the legitimate users to change their password.

At step S506, the second node 300 sends the key $k_B$, index number $c_B$ of the valuable data $V_B$, the applied shuffle $\pi_B$ and the second blinding function b'$_B$ in delayed form to the first node 200.

Alternatively, any of the key $k_B$, index number $c_B$, permutation $\pi_B$ and the second blinding function b'$_B$ can be sent in delayed form as part of the commitment phase.

Advantageously, by delaying the second blinding function b'$_B$ and sending it from the first node 200 to the second node 300, the second node 300 will eventually have the information to determine whether or not the first node 200 received the valuable data $V_B$.

The process moves to step S508. At step S508, the first node 200 sends a hash of the key and the plurality of messages MA$_i$ to the second node 300.

The process moves to step S510. At step S510, the second node 300 sends a hash of the key and the plurality of messages MB$_i$ to the first node 200.

Advantageously, by using a delay function, in the event of the run being aborted at a point when comparison might be possible by either party and they have sent correct messages, each will know reveals of $V_A$ or $V_B$ through revealing the respective $k_X$. That way, if an honest party receives incorrect value(s) in the reveal phase she will be able to tell.

Once each of the first node 200 and the second node 300 have performed the preliminary steps such that they both hold the valuable data, but are unaware of which message the valuable data is held in, then the first node 200 and the second node 300 can exchange messages in an alternating manner. For example, the first node 200 (node A) and the second node 300 (node B) may exchange messages B(b$_B$, MA$_i$) and B(b$_A$,MB$_i$), in pairs. Typically it is determined who has the job of sending the first of each pair, and who the second. For example, the first node 200 (A) might be given the job of sending the first of the first pair, then the second node 300 (B) the first of the second pair, and so continuing to alternate so that the first node 200 (A) sends 1 message, then each sends 2 alternately until there is only one left (which will be sent by the first node 200 (A) if k is even and the second node 300 (B) if it is odd).

For symmetry, it is assumed that the parties "toss a coin" to decide which goes first. Suppose the first node 200 (node A) is communicating with some imposter I (for example, node C shown at FIG. 1) pretending to be the second node 300 (node B). One of the B(b$_A$,MB$_i$) that I holds will probably reveal to the first node 200 (A) that I is an imposter, but I does not know which one. If I now aborts before he sends any of these he now has only a $$\frac{1}{2k}$$

chance of being able to check if $V_A=V_B$. To improve his chance of obtaining this information he should send some of his messages. Let's examine what happens if he decides to send his messages until he gets the crucial one from A, he has approximately a 50% chance of "winning" (i.e. checking his to see if $V_A=V_B$ without letting A doing the same.) He is able to do this because he knows immediately when the crucial B(b$_B$,MA$_i$) is sent, and can then abort. Alternatively, though less preferably, the process can default to either the first node 200 or the second node 300 going first.

This does not apply if the node cannot determine which of the messages is the crucial one that communicates $V_X$ until beyond a time by when all the exchanges must have taken place. The use of such delays means that I must effectively decide ab initio how many of his messages to risk in order to get some of A's: he does not get any useful information about those he receives during the process to modify his strategy. This means that in order to get chance a of discovering if $V_A=V_B$ he has to give away at least an $a(1-k^{-1})$—of A discovering this (given the pattern of exchange described above).

One way of introducing a delay function is to apply it to the B(b$_B$,MA$_i$) and B(b$_A$,MB$_j$) that are sent in the exchange. This is shown below with reference to FIG. 6. An equivalent and probably more efficient one is for each of the first node 200 (A) and the second node 300 (B) to send a single delayed message such as key $k_A$ which is needed to reveal which of the MA$_i$ or MB$_j$ is crucial. Thus they exchange delay($k_A$) and delay($k_B$), with the MA$_i$ and MB$_i$ being encryptions of k different things, only one of which is the valuable data $V_A$ or $V_B$ respectively. There is no need to add extra messages since the delayed keys could be included in an existing one, provided it was no later than the first sent by the respective party in the exchange. The improved efficiency of this approach is apparent when auditing a failed run since only a single delay term needs to be opened.

Figure 5:
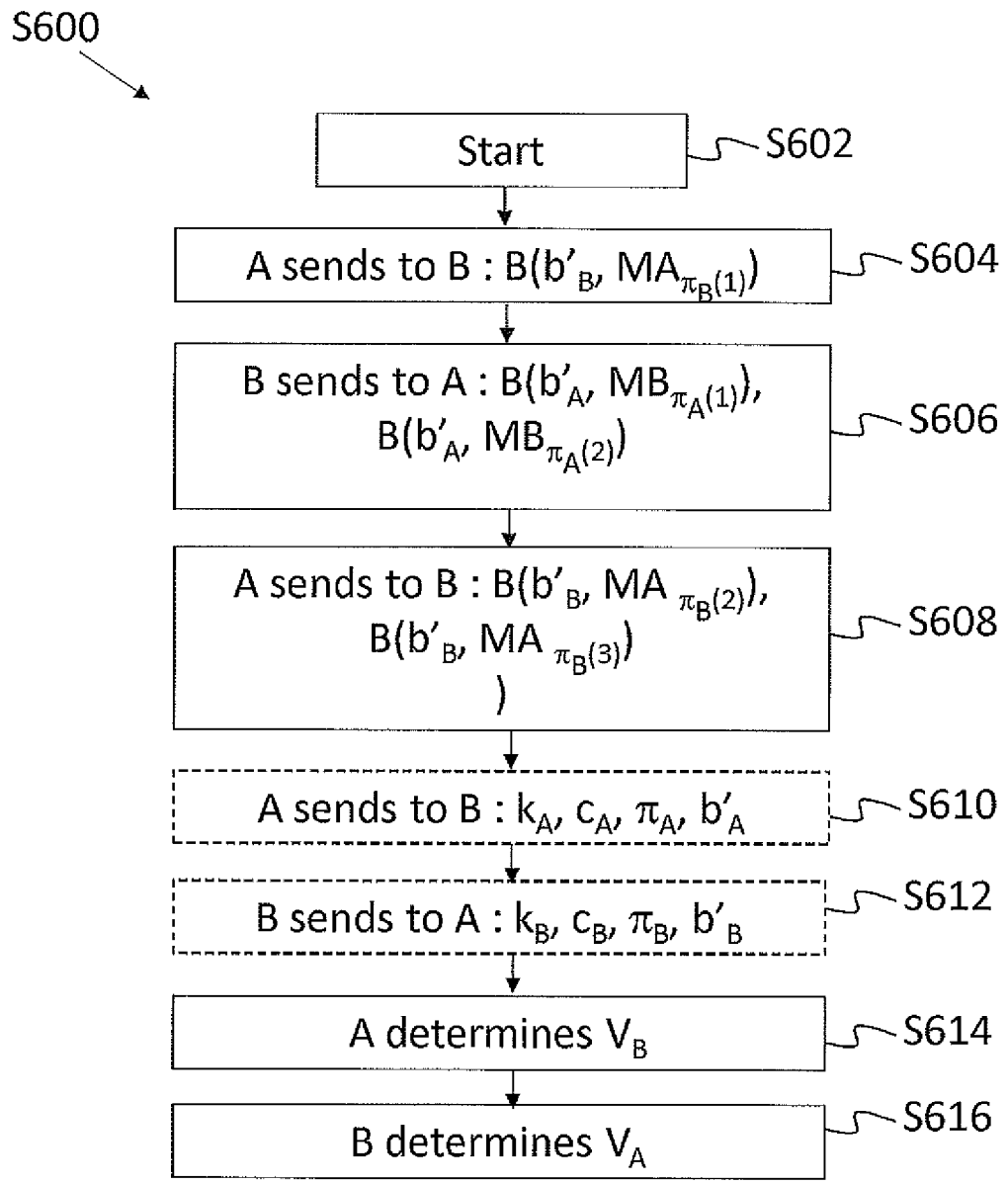
FIG. 5 is a flow chart showing exchange and reveal phases of an exchange protocol.

FIG. 5 is a flow chart S600 of the exchange and reveal phase of the exchange protocol. The flow chart S600 describes an exchange protocol that is optionally implemented along with the commitment phase described with reference to FIG. 4. The process begins at step S602.

The process then moves to step S604, where the first node 200 sends one message to the second node 300.

The process then moves to step S606. At step S606, the second node 300 sends two messages to the first node 200.

The process then moves to step S608, where the first node 200 sends two messages to the second node. Equivalent steps to S606 and S608 are then repeated for subsequent messages until all shuffled blinded messages have been exchanged.

Optionally, at step S610, the first node 200 sends the key $k_A$, index number $c_A$ of the valuable data $V_A$, the applied shuffle $\pi_A$ and the second blinding key b'$_A$ to the second node 300. The information sent at step S610 is used if required to read the valuable data $V_A$ by reverse engineering the information based on the received content of the messages. This prevents the need to open delay mechanism used in the commitment phase S304 when the process was not aborted prior to all message being exchanged.

Optionally, at step S612, the second node 300 sends the key $k_B$, index number $c_B$ of the valuable data $V_B$, the applied shuffle $\pi B$ and the second blinding function b'$_B$ to the first node 200. The information sent at step S612 is used if required to read the valuable data $V_B$ by reverse engineering the information based on the received content of the messages.

The process moves to step S614, where the first node 200 determines the valuable data $V_B$. When the first node 200 has received the unblinded messages from the second node 300, it is able to remove the encryption that the first node 200 originally applied to the function, thereby to have MB$_j$ for the messages received. It is now possible for the first node 200 to use the information that it has to determine the valuable data $V_A$. Which of the clear text messages contains the valuable data may be self-evident, or the index $c_B$ sent at either step S506 or S612. can be used to locate the correct message.

The process moves to step S616, where the second node 300 determines the valuable data $V_A$ in a similar manner described above with reference to step S614.

Figure 6:
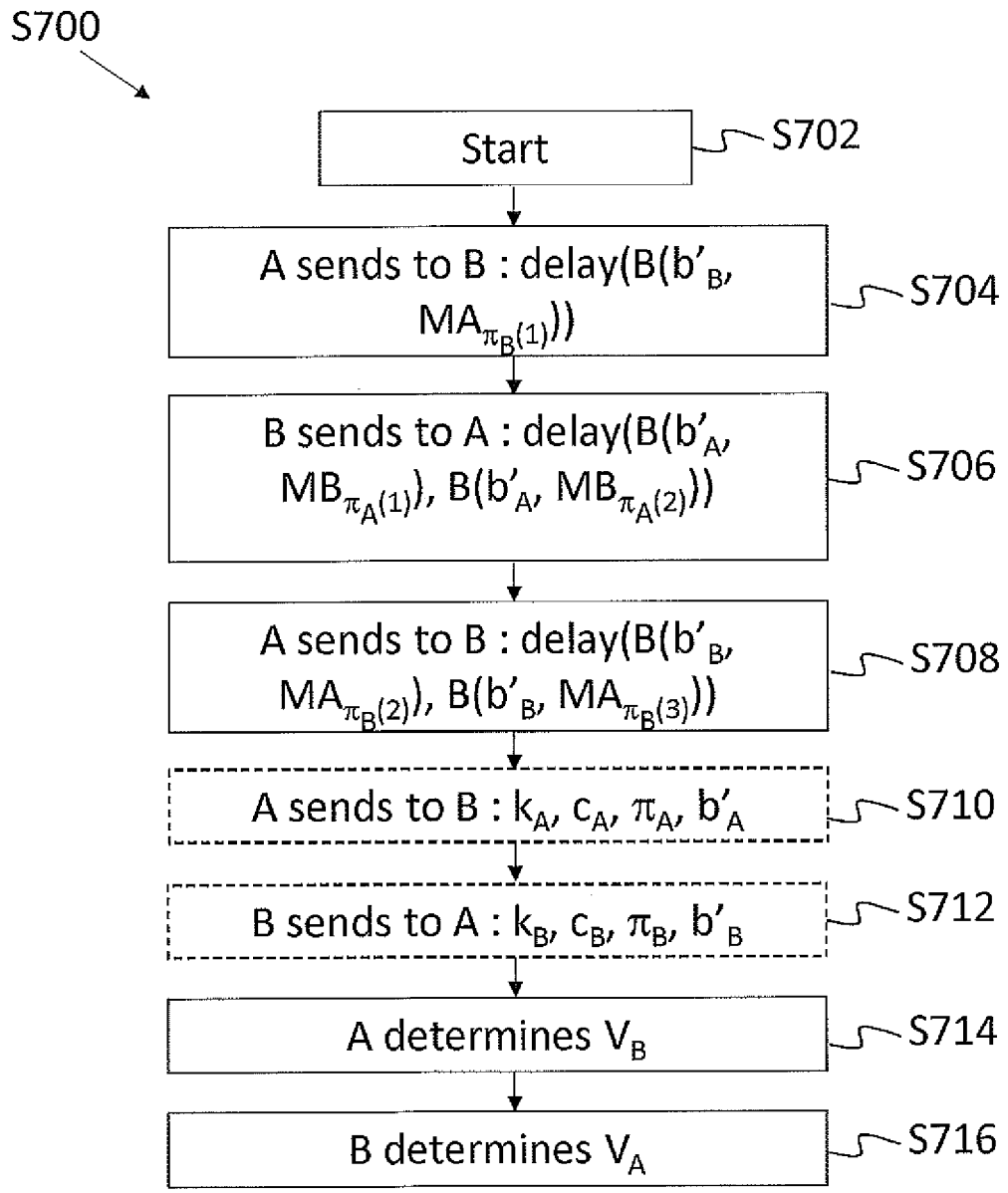
FIG. 6 is a flow chart showing exchange and reveal phases of another exchange protocol.

FIG. 6 is a flow chart S700 showing an alternative mechanism for exchanging and revealing valuable data in an exchange protocol. The flow chart S700 is implemented without the need for the further information to be sent in delayed form thereby to commit the nodes to the valuable data that they are sending. If the messages are not sent in delayed form, it would be possible for an attacker to abort the protocol after they have discovered that they have received the valuable data. This provides a chance for the attacker to receive the valuable data, without having sent a message that supposedly includes their valuable data to the other party which if reads would reveal that they are an imposter/attacker. Even without a delay mechanism, an attacker is made less likely to do this because the blinded and shuffled nature of the messages means that they do not know if the messages that they have sent include the data that will reveal them as an imposter. However, should they receive their valuable data very early they could be tempted to take the risk that will reveal their presence. With suitable delay mechanism(s), the attacker will not know when the valuable data is received until after they have sent all of their messages. This means that they would only be guessing when they abort the protocol, with no idea if either party has received the message including the valuable data (in the case of the attacker) or the false valuable data (in the case of the other node).

The process begins at step S702.

The process moves to step S704, where the first node 200 sends one message to the second node 300 in delayed form.

The process then moves to step S706. At step S706, the second node 300 sends two messages to the first node 200 in delayed form.

The process then moves to step S708, where the first node 200 sends two messages to the second node in delayed form.

Optionally, at step S710, the first node 200 sends the number $c_A$ of the valuable data $V_A$, the applied shuffle $\pi_A$ and the second blinding function $b'_A$ in delayed form to the second node 300.

Optionally, at step S712, the second node 300 sends the index number $c_B$ of the valuable data $V_B$, the applied shuffle $\pi_B$ and the second blinding function $b'_B$ in delayed form to the first node 200.

The process moves to step S714, where the first node 200 determines the valuable data $V_B$. This occurs once the delay applied to the messages has expired.

The process moves to step S716, where the second node 300 determines the valuable data $V_A$. This occurs once the delay applied to the messages has expired.

When delay mechanisms are used with any of the steps of process S300 mentioned above, if either party fails to receive complete the process before time T when the delay mechanism expires it can be chosen to abandon the protocol to prevent use of information from the delay mechanisms being used before other steps of the process have been completed.

If the protocol is aborted before the exchange and reveal phase S306, then neither node has received enough to determine the valuable data $V_A$ or $V_B$.

If it is aborted during the completion phase where the valuable data is exchanged openly between the nodes, then once the delays have opened, an honest node can audit the messages received so far to determine whether all the messages it has received are coherent, and whether it should hold sufficient information to determine the other's $V_X$. That is, it extracts the other party's index value from the Delay and from this along with knowledge of the permutation it applied it can determine if the real $V_X$ term should be in the set received to that point. It also knows if its own $V_X$ has been revealed.

If it is aborted after the completion phase where the valuable data are exchanged openly between the first node 200 and the second node 300, an honest node can audit as above but now certainly has the information to determine $V_X$, or establish that the other party cheated in the construction of the terms.

In preferred forms the delays only have to be opened in an aborted run because in a completed run the values $V_A$ and $V_B$ will have been exchanged and can be checked against the values committed earlier.

An example of an auditable PAKE protocol is described here:

For ease of presentation the (1, 2, 2, . . . , 2) pattern of exchanges is opted for, where both parties generate k−1 fake values. It is supposed that A and B have just run a PAKE and so have computed $K_A$ and $K_B$ respectively, and they now wish to establish in a probabilistically fair fashion if $K_A=K_B$. In fact, they will not of course reveal these in the clear but rather values derived in a one-way fashion from these, e.g:
$V_A:=\text{Hash}(K_A,A,B)$
$V_B:=\text{Hash}(K_B,A,B)$ A generates a random seed value s from which the fake key values $M_{A,i}$ will be generated, an index $c_A$ for the real $V_A$, a fresh key $k_A$, and blinding factors $b_A$ and $b'_A$:
$s \in_R K,$
$k_A \in_R K,$
$c_A \in_R \{1, \ldots, k\},$
$b_A \in_R \mathcal{E},$
$b'_A \in_R \mathcal{E},$
$\pi_A \in_R \Pi_k$ Here $\in_R X$ indicates drawn at random from the set X and $\Pi_k$ denotes the set of permutations of k objects. K is the space of keys, which we will assume is the same of the blocksize of the cipher $\mathcal{C}$, e.g. 128 bits. $\mathcal{E}$ is the space from which the blinding factors are drawn. A now computes:
$M_{A,i}:=\text{Hash}(i,s), i\in\{1, \ldots, k\}/c_A$
$M_{A,cA}:=\{V_A\}k_A$ Here i,s is a concatenation of the index i with the seed, s. A now blinds the $M_{A,i}$ terms using her first blinding function $b_A$. Note all the terms are blinded with the same function in order to allow A to unblind them later without knowing which is which. B performs the corresponding calculations with A↔B.

They now exchange Delay terms containing the encryption key, the index $c_X$ (to the term containing their real $V_X$), their $W_X$ terms and their permutation. At the same time they exchange the blinded $M_X$ terms, but without delay wrappers:
A→B : $\text{Delay}(k_A),\text{Delay}(c_A),\text{Delay}(\pi_A),\text{Delay}(s_A),\{B(b_A, M_{Ai})|i\leftarrow\{1, \ldots, k\}\}$
B→A : $\text{Delay}(k_B),\text{Delay}(c_B),\text{Delay}(\pi_B),\text{Delay}(s_B),\{B(b_B, M_{Bi})|i\leftarrow\{1, \ldots, k\}\}$ Note that the Delay terms serve a dual purpose: to conceal the contents for some lower bounded time period and to commit the sender to the contents.

Now each re-blinds the MX terms that they have just received under their own second blinding key b0X, they permute the resulting terms under their chosen permutation $\Pi X$ and send the resulting list back to the other:

$A \to B : \{B(b'_A, B(b_B, M_{B,\Pi A(i)}))|i \leftarrow \{1 \ldots\}\}$
$B \to A : \{B(b'_B, B(b_A, M_{A,\Pi B(i)}))|i \leftarrow \{1 \ldots k\}\}$ On receipt of these terms, each can strip off their own blinding function to yield a list of their own $M_X$ terms but blinded and shuffled by the other. Consequently, neither knows which term contains their real $V_A$. This A now holds the list: and similarly for B.

Now they are ready to start exchanging these terms progressively according the prescribed alternating schedule:

$A \to B : B(b'_B, M_{A,\pi B(1)})$
$B \to A : B(b'_A, M_{A,\pi A(1)}), B(b'A, M_{A,\pi A(2)})$
$B \to A : B(b'_B, M_{A,\pi B(2)}), B(b'_B, M_{A,\pi A(3)})$

.
.

$B \to A : B(b'_A, M_{A,\pi A(k-1)}), B(b'_A, M_{A,\pi A(k)})$

Each can strip off their own blinding function to reveal the encryptions of the other's $M_{Xi}$, terms, one of which should be the encryption of $V_X$ and the others dummies.

Assuming that this runs to completion they can now exchange their $k_X$, $c_X$ and $s_X$ terms:

$A \to B: k_A, c_A, s_A$
$B \to A: k_B, c_B, s_B$

Now that they know the others index value, so with the knowledge of their own permutation they can identify which term contains the real $V_X$ and they can decrypt this with the newly revealed $k_X$.

Figure 7:
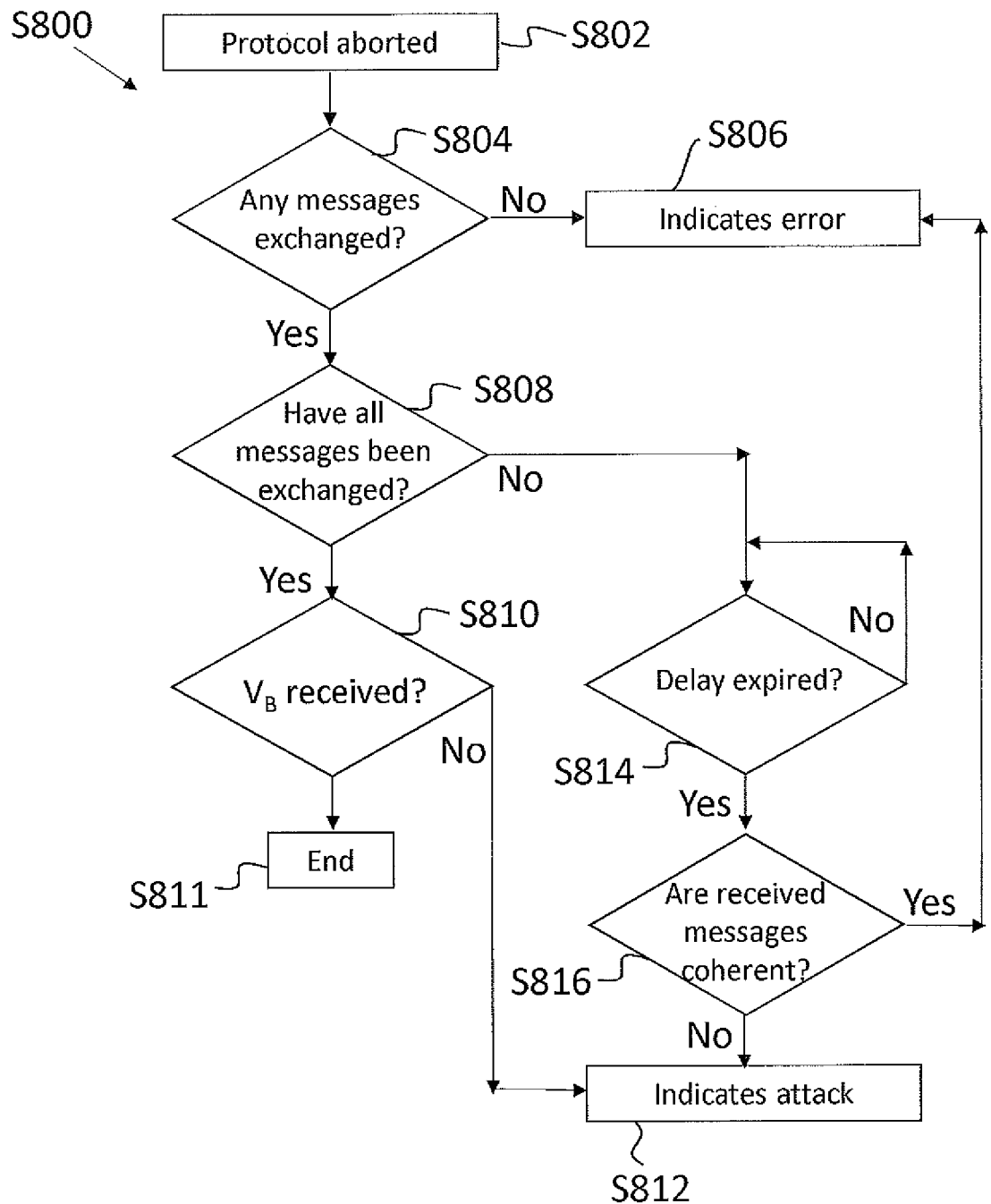
FIG. 7 is a flow chart showing an auditing process of an exchange protocol.

FIG. 7 is a flow chart S800 showing a process for determining if the exchange protocol needs to be audited. In the example of FIG. 7, the process is performed by a trustworthy node, which may be the first node 200 of FIG. 2. The process assumes that the first node 200 wishes to obtain valuable data $V_B$ from the second node 300.

The process begins at step S802 following the exchange protocol being aborted. It is then determined at step S804 if any messages have been exchanged between a first node 200 and a second node 300 (for example, in accordance with the process described with reference to FIGS. 5 and 6). If no messages have been exchanged between the nodes, there is not enough information to conclude that an attack has taken place, but it does indicate that there is some type of error. The process therefore moves to step S806, where an error is indicated.

If some messages have been exchanged during the exchange and reveal phase, the process moves to step S808, where it is determined if all of the messages have been exchanged. If all of the messages have been exchanged, the process moves to step S810 and it is determined if the valuable data $V_B$ has been received. If all of the messages have been received but the valuable data $V_B$ is not contained within the messages, the process moves to step S812, where it is indicated that an attack has taken place. If all of the messages have been received and the valuable data has been received at step S810, the auditing process moves to step S811, where it is ended.

If not all messages have been exchanged at step S808, the process moves to step S814, where it is determined if delayed information that enables the messages to be read has been sent and if the delay has expired. If the delay has expired, the process moves to step S816. If the delay has not expired, the process waits for the delay to expire. The process then moves to step S816, where it is determined, using the delayed information, if applicable, whether the messages that have been received are coherent messages. If the messages are coherent messages, the failure of the protocol has been subject to an error and the process moves to step S806. However, if the messages are not coherent, it is indicative of an attack and the process moves to step S810.

At step S816, the first node 200 takes a number of steps to determine the coherency of the received messages. If there are delay wrappers, once these have opened, the first node 200 checks that the other party Y (for example the second node 300, which may be an attacker where Y=B) has provided a valid key $k_Y \in K$, a valid index $c_Y$ in the range $(1, \ldots, k)$, a valid blinding key $b'_X$ and a valid permutation $\pi_Y$ over k objects and finally a valid seed value $s_Y \in K$. The first node 200 also checks, using knowledge of $\pi_x$ and $b'_x$, whether Y (e.g., the second node 300) performed the committed permutation of the reblinding.

In the case that the exchange protocol aborts at some point in during the exchange and reveal phase (S306 of FIG. 2A, as described above in detail with reference to FIGS. 5 and 6), say after X (e.g., the first node 200) has received I terms from Y (e.g., the second node 300), then X computes $\pi_X(cY)$ and if this is less that I then the $\{V_Y\}k_Y$ terms should be in the set X has received. X should decrypt this term and can now establish if $K_X = K_Y$. If $\pi_X(c_Y) > I$ then he has not received the critical term and cannot conclude whether $K_A = K_B$ or not.

For all the terms received in the exchange and reveal phase (S306 of FIG. 2A), X should check that they are correctly formed, i.e. of the form $M_{i,y} = \text{Hash}(\pi_X^{-1}(i), s_Y)$, for all $i \leq I$ and i $6 = c_Y$. This check should be performed even if Phase 4 competes, i.e. if I=k. By this means X will be able to tell if Y has followed the protocol correctly. If not an attacker is present. If so and he can tell that $K_A 6 = k_B$ then Y has made an incorrect guess so is assumed to be an attacker.

It is possible to manipulate the above-described exchange protocols in order to control the probability with which an attacker would be able to chance exchanging messages without being detected. By controlling the probability, it is possible to reduce the likelihood that an attacker would risk attacking the exchange protocol, for fear of being caught. For example, in a given network there are 2N parties who will pair off and try to connect to one another in N protocols runs. The probability of an individual password guess by an intruder being correct is $\varepsilon$. Each pair are prepared to make T tries at pairing if they think that communications failings are getting in their way. Therefore, if the pairs use some PAKE to establish their links without using our modified protocols, the intruder can expect to have approximately NT $\varepsilon$ successes in breaking into the pairs without any chance of being discovered. (The approximation is because the intruder only needs to break each pair once, and so will stop attacking a given pair before the Tth if it succeeds before then. It is however a good approximation provided the probability of it succeeding in T tries is significantly less than 1, something we would expect in practice.)

If the protocol were now changed to be auditable, as described above, for example an auditable PAKE, this expectation would decrease to $$\frac{N(T-1)\epsilon}{2k}:$$

the −1 is explained because in order to break in with no chance of being detected a run must be abandoned, so cannot be the last of T. (The discovered password is then used on a subsequent run within the T.) If on each run the intruder is willing to give away a $(1-\varepsilon)/k$ chance of being caught (i.e. give away one of his $MB_i$ on each run) this will multiply the expected successes by 3 (rather than only getting only one share in half the runs he will now get one in half the runs and two in the other half), but will have an expectation of being discovered approximately $$\frac{N(T-1)(1-\epsilon)}{2k}$$

times. This means near certain discovery in many cases. In effect the intruder playing this game would give him 3 password guesses for each time he is discovered.

With the pattern of exchange nominated earlier, for example as described with reference to FIG. 5 above, the ratio of successes gets worse for the attacker as the number of $MB_j$, that he is willing to send increases. For example if he is willing to send 2 or 3 it reduces to $(5/3)\epsilon$ or $(7/5)\epsilon$ (In essence if prepared to give up r, the intruder has a 0.5 probability of giving up r−1 for r of node A's and a 0.5 probability of giving up r for r+1, depending on who starts the exchange.

By picking a different sending strategy to the 1,2,2,2, . . . one we could keep all the ratios below 3 $\epsilon$ and substantially reducing the number of messages sent. For example sending 1,2,3,4, . . . would still result in ratios converging to 1 as the attacker yields more shares, with first term 3 $\epsilon$, but uses only about $\sqrt{k}$ exchanges. However picking k large enough to keep $$\frac{N(T-1)\epsilon}{2k}$$

sufficiently small may require nodes to create and blind more $MX_i$ than is ideal.

One can reduce the amount of work the nodes have to do by replacing what we might term the linear division strategy (i.e. the probability of being able to deduce $V_X$ grows linearly with the number of $MX_i$ one has seen) by a quadratic one. In this there are two specific $MX_i$ that are required to deduce $V_X$, meaning that the probability of having them both grows quadratically with the number one has, in the initial phase of the exchange. For example X might initially send $\{\{V_X\}_{kx1}\}_{kx2}$ under a delay, making the $MX_i$ a number of keys that include $k_{x1}$ and $k_{x2}$. Of course one could extend this to higher degrees. In the quadratic case with k messages in all, one must have r>1 of them to have any chance of having both the two crucial ones, with the probability then being $((r(r-1))/(k(k-1)))$.

If, for example, we picked k=10 and the $MX_i$ exchanged using the 1,2,2,2, . . . pattern we assumed previously, the attacker could give away one key without fear of giving himself away, and could (if willing to go no further) expect a 1/90 chance of having his guess checked, and therefore a $$\frac{\epsilon}{90}$$

chance of obtaining the key. This improves from the $$\frac{\epsilon}{20}$$

chance using k=10 with the linear approach. The amount of blinding (which is likely to be comparatively the most expensive part of our approach, computationally) is exactly the same in these quadratic and linear examples.

Therefore this quadratic approach reduces the chance our attacker has of breaking any of the N runs without giving away a much bigger chance of being caught.

The designer of any implementation is of course free to choose an approach to devising and exchanging tokens that is believed to be optimal in terms of the perceived threat, communication costs and computation costs. What we have shown in this section is that there are many options other than the linear 1,2,2,2, . . . one adopted earlier.

The implementation of the above-described exchange protocols provide the means to ensure that the probability of each party in a protocol getting what it wants from an aborted exchange is always equal. Specifically, what is achieved is to bound the difference between these probabilities to be below any positive tolerance. This is done by ensuring that A and B are ignorant of which of a number of messages they send or receive actually communicates $V_A$ or $V_B$. This is done by a combination of randomisation, blinding and delay: each sends the other a series of messages, knowing that one of the messages in each direction actually communicates $V_A$ or $V_B$ but such that neither of them know which until this process is complete because either these messages or something that enables them is delayed. Here, by "communicates", we mean that if A, say, receives all messages from B up to and including this one, then it will eventually (i.e. perhaps after waiting for one or more delays to open) be able to calculate the value $V_B$ without any further input from B (or anyone else).

Numbered Statements of Invention

1. A computer implemented method of exchanging first valuable data at a first node for second valuable data from a second node, the method comprising the steps of:

applying a first encryption to a first plurality of messages, at a first node, with a function having a commutative property, so as to create a blinded first plurality of messages;

sending the blinded first plurality of messages from the first node to the second node, wherein the first valuable data is concealed in one message of the blinded first plurality of messages;

in response to receiving a blinded second plurality of messages at the first node, wherein the second valuable data is concealed in one message of the blinded second plurality of messages and the blinded second plurality of messages have been encrypted with a second encryption:

applying a third encryption to the blinded second plurality of messages with a function having a commutative property so as to create double blinded second plurality messages which have been encrypted with at least the second encryption and the third encryption;

sending the double blinded second plurality messages from the first node to the second node;

in response to receiving double blinded first plurality messages at the first node, subsequent to sending double blinded second plurality messages from the first node to the second node, wherein the double blinded first plurality of messages have been encrypted with at least the second encryption and a fourth encryption and it is concealed as to which double blinded message contains the second valuable data:

removing the first encryption of the second plurality of double blinded messages to provide partially decrypted blinded first plurality of messages which remain encrypted with the third encryption; and after removing the first encryption:

sending at least one message of the partially decrypted blinded first plurality of messages to the second node; and in response to receiving at least one partially decrypted message subsequent to sending at least one message of partially decrypted blinded first plurality of messages to the second node, wherein the received at least one partially decrypted message which is one of the second plurality of messages with the second encryption removed;

exchanging with the second node further partially decrypted messages of the first and second plurality of messages.

2. The method of 1 comprising:

selecting the order in which the second plurality of messages are sent as double blinded messages by the first node so that it is concealed as to which double blinded message contains the second valuable data.

The invention claimed is:

1. A computer implemented method of exchanging first valuable data at a first node for second valuable data from a second node, the method comprising the steps of:

applying a first encryption to a first plurality of messages, at the first node, with a function having a commutative property, so as to create a blinded first plurality of messages;

sending the blinded first plurality of messages from the first node to the second node, wherein the first valuable data is concealed in one message of the blinded first plurality of messages;

receiving a blinded second plurality of messages at the first node, wherein the second valuable data is concealed in one message of the blinded second plurality of messages and the blinded second plurality of messages have been encrypted with a second encryption;

in response to receiving the blinded second plurality of messages at the first node, applying a third encryption to the blinded second plurality of messages with a function having a commutative property so as to create double blinded second plurality messages which have been encrypted with at least the second encryption and the third encryption;

sending the double blinded second plurality messages from the first node to the second node;

subsequent to sending double blinded second plurality messages from the first node to the second node, receiving double blinded first plurality messages at the first node, wherein the double blinded first plurality of messages have been encrypted with at least the first encryption and a fourth encryption;

in response to receiving double blinded first plurality messages at the first node, removing the first encryption of the second plurality of double blinded messages to provide partially decrypted blinded first plurality of messages which remain encrypted with the fourth encryption;

after removing the first encryption, sending at least one message of the partially decrypted blinded first plurality of messages to the second node;

subsequent to sending at least one message of partially decrypted blinded first plurality of messages to the second node, receiving at least one partially decrypted message which is one of the second plurality of messages with the second encryption removed; and in response to receiving at least one partially decrypted message, exchanging with the second node further partially decrypted messages of the first and second plurality of messages.

2. The method of claim 1 comprising the step of:

removing the first encryption from at least one of the received partially decrypted messages to reveal the second valuable data.

3. The method of claim 2 comprising the step of:

removing the first encryption from all of the received partially decrypted messages to reveal the second valuable data.

4. The method of claim 1, wherein all of the first and second plurality of messages are exchanged.

5. The method of claim 1, wherein the further partially decrypted messages are exchanged alternately, preferably pairwise.

6. The method of claim 1, further comprising:

shuffling the order of the second plurality of messages at the first node, prior to sending as double blinded messages, such as by applying a permutation function.

7. The method of claim 1, further comprising:

selecting the order in which the second plurality of messages are sent as double blinded messages by the first node so that it is concealed as to which double blinded message contains the second valuable data.

8. The method of claim 1, further comprising the steps of:

creating an index of the first plurality of messages at the first node;

associating one index value of the index of the first plurality of messages with the message in which the first valuable data is concealed;

and revealing the associate index value to the second node after the exchange of partially decrypted messages.

9. The method of claim 8 wherein the associate index is sent to the second node with a delay mechanism that is not revealable until after a predetermined time and wherein the exchange of further partially encrypted messages is completed before the predetermined time.

10. The method of claim 1, wherein the key and/or function used for the third encryption is sent to the second node with a delay mechanism that is not revealable until after a predetermined time and wherein the exchange of further partially encrypted messages is completed before the predetermined time.

11. The method of claim 6 wherein a value used to determine the shuffled order, such as a permutation value, is send with a delay mechanism that is not revealable until after a predetermined time and wherein the exchange of further partially encrypted messages is completed before the predetermined time.

12. The method of claim 1, further comprising applying a delay mechanism that prevents the first valuable data being revealed within a predetermined time and wherein the exchange of further partially encrypted messages is completed before the predetermined time.

13. The method of claim 12 wherein the delay mechanism is or has been applied to at least one, and preferably each, of the exchanged partially decrypted messages.

14. The method of claim 12 wherein another encryption is applied to the first plurality of messages at some stage before sending at least one message of the partially decrypted blinded first plurality of messages to the second node, and the key to the another encryption required to decrypt the content and determine the second valuable data is send to the second node with delay mechanism that prevents the key to the another encryption being revealed within a predetermined time and wherein the exchange of further partially encrypted messages is completed before the predetermined time.

15. The method of claim 12 wherein the key to the another encryption is sent to the second node without a delay mechanism after the exchange of further partially encrypted messages is completed.

16. The method of claim 1, wherein if the exchange of partially encrypted messages is aborted before all of the partially decrypted messages of the second plurality of messages have been received or no messages partially decrypted messages are received subsequent to sending at least one message of partially decrypted blinded first plurality of messages to the second node,
    auditing data that has been received from the second node to establish whether the abort may have been part of an attack.

17. The method of claim 16 whereby as part of the auditing step it is determined whether second valuable data received from the second node is correct data.

18. The method of claim 17 when dependent on claim 8 wherein it is determined whether second valuable data has been received from the second node by using an associated index received from the second node.

19. The method of claim 14, whereby as part of the auditing step, a received shuffling value of the permutation function/or the key and/or function used for the fourth encryption is checked against the received partially decrypted messages to determine if the second node performed the shuffling or fourth encryption in accordance with the commitment from the received shuffling value or the key and/or function used for the fourth encryption.

20. The method of claim 1, wherein the first and/or second valuable data is required to reveal further valuable data.

21. The method of claim 20 where the first and/or second valuable data is a key that can be used to decrypt further valuable data.

22. The method of claim 1, wherein the first plurality of valuable data includes the first valuable data and the first plurality of valuable data, the first plurality of valuable data is concealed across multiple messages of the blinded first plurality of messages and the second plurality of valuable data is concealed across multiple message of the blinded second plurality of messages.

23. The method of claim 22 wherein all of the first plurality and/or second plurality of valuable data is required to reveal further valuable data.

24. The method of claim 23 where two or more, and preferably each, of the plurality of valuable data are keys that can be used in combination to decrypt further valuable data.

25. The method of claim 22, wherein the function having a commutative property used for the first encryption is different from the function used for the third encryption.

26. The method of claim 22, wherein the step of receiving a blinded second plurality of messages occurs at one of: before the step of sending the blinded first plurality of messages; after the step of receiving double blinded first plurality messages; and between the steps sending the blinded first plurality of messages and receiving double blinded first plurality messages.

27. A computer implemented method of exchanging first valuable data at a first node with second valuable data at a second node, the method comprising the steps of:
    generating a first plurality of messages, at the first node, wherein the first valuable data is in one message of the first plurality of messages;
    generating a second plurality of messages, at the second node, wherein the second valuable data is in one message of the second plurality of messages;
    sending the first and second plurality of messages between the nodes using an blinding protocol such that:
    blinded versions of the first plurality of messages are stored at the first node, wherein blinded versions of the first plurality of messages can be unblinded by a first key which is accessible by the second node but not the first node, and wherein which of the blinded first plurality of messages that contains the first valuable data is concealed from the first node due to the first key not being accessible by the first node; and blinded versions of the second plurality of messages are stored at the second node, wherein blinded versions of the second plurality of messages can be unblinded by a second key which is accessible by the first node but not the second node, and wherein which of the blinded second plurality of messages that contains the second valuable data is concealed from the second node due to the second key not being accessible by the second node;
    sending at least one message of the blinded versions of the first plurality of messages from the first node to the second node;
    sending at least one message of the blinded versions of the second plurality of messages from the second node to the first node
    and subsequently exchanging further messages of the blinded versions of first and second plurality of messages, between nodes.

28. The method of claim 27, wherein the first plurality of valuable data includes the first valuable data and the first plurality of valuable data is across multiple messages of the first plurality of messages;
    wherein the second plurality of valuable data includes the second valuable data and the second plurality of valuable data is across multiple message of the second plurality of messages, wherein more than one of the first plurality and/or second plurality of valuable data is required to reveal further valuable data.

29. The method of claim 28 wherein two or more, and preferably each, of the plurality of valuable data are keys that can be used in combination to decrypt further valuable data.

30. A computer implemented method of exchanging first valuable data at a first node for second valuable data from a second node, the method comprising the steps of:
    applying a first encryption to a first plurality of messages, at the first node, with a function having a commutative property, so as to create a blinded first plurality of messages;
    sending the blinded first plurality of messages from the first node to the second node, wherein the first valuable data is concealed in one message of the blinded first plurality of messages;
    receiving a blinded second plurality of messages at the first node, wherein the second valuable data is concealed in one message of the blinded second plurality of messages and the blinded second plurality of messages have been encrypted with a second encryption;
    in response to receiving the blinded second plurality of messages at the first node, applying a third encryption to the blinded second plurality of messages with a function having a commutative property so as to create double blinded second plurality messages which have been encrypted with at least the second encryption and the third encryption;

sending the double blinded second plurality messages from the first node to the second node;

subsequent to sending double blinded second plurality messages from the first node to the second node, receiving double blinded first plurality messages at the first node, wherein the double blinded first plurality of messages have been encrypted with at least the first encryption and a fourth encryption;

in response to receiving double blinded first plurality messages at the first node, removing the first encryption of the second plurality of double blinded messages to provide partially decrypted blinded first plurality of messages which remain encrypted with the fourth encryption;

receiving at least one partially decrypted message which is one of the second plurality of messages with the second encryption removed; and subsequent to receiving at least one partially decrypted message and after removing the first encryption, sending at least one message of the partially decrypted blinded first plurality of messages to the second node;

and after sending at least one partially decrypted message, exchanging with the second node further partially decrypted messages of the first and second plurality of messages.

31. A non-transitory medium comprising computer readable instructions for exchanging first valuable data at a first node for second valuable data from a second node, wherein the instructions which when executed by one or more processors at a first node cause the first node to:

apply a first encryption to a first plurality of messages, with a function having a commutative property, so as to create a blinded first plurality of messages;

send the blinded first plurality of messages from the first node to the second node, wherein the first valuable data is concealed in one message of the blinded first plurality of messages;

in response to receiving a blinded second plurality of messages, wherein the second valuable data is concealed in one message of the blinded second plurality of messages and the blinded second plurality of messages have been encrypted with a second encryption, apply a third encryption to the blinded second plurality of messages with a function having a commutative property so as to create double blinded second plurality messages which have been encrypted with at least the second encryption and the third encryption;

send the double blinded second plurality messages from the first node to the second node;

in response to receiving double blinded first plurality messages at the first node, subsequent to sending double blinded second plurality messages from the first node to the second node, wherein the double blinded first plurality of messages have been encrypted with at least the first encryption and a fourth encryption and it is concealed as to which double blinded message contains the second valuable data;

remove the first encryption of the second plurality of double blinded messages to provide partially decrypted blinded first plurality of messages which remain encrypted with the fourth encryption;

after removing the first encryption, send at least one message of the partially decrypted blinded first plurality of messages to the second node; and in response to receiving at least one partially decrypted message, subsequent to the sending of at least one message of the partially decrypted blinded first plurality of messages to the second node, wherein the received partially decrypted message is one of the second plurality of messages with the second encryption removed, send further partially decrypted messages of the first plurality of messages in response to receiving further partially decrypted messages of the second plurality of messages from the second node.

* * * * *